United States Patent
Ohara et al.

(10) Patent No.: US 9,666,858 B2
(45) Date of Patent: May 30, 2017

(54) NEGATIVE ELECTRODE FOR SECONDARY BATTERY, AND PROCESS FOR PRODUCTION THEREOF

(75) Inventors: Kenji Ohara, Yokohama (JP); Sohei Suga, Yokohama (JP); Yasuo Ohta, Yokohama (JP); Tomoya Kubota, Yokohama (JP); Kazuyuki Sakamoto, Hiratsuka (JP); Takaaki Abe, Yokohama (JP); Satoru Ichikawa, Yokosuka (JP); Kenji Hosaka, Yokohama (JP); Kosuke Hagiyama, Yokohama (JP); Hiroshi Miyakubo, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 13/700,651

(22) PCT Filed: May 25, 2011

(86) PCT No.: PCT/JP2011/061990
§ 371 (c)(1),
(2), (4) Date: Nov. 28, 2012

(87) PCT Pub. No.: WO2011/152263
PCT Pub. Date: Dec. 8, 2011

(65) Prior Publication Data
US 2013/0071741 A1 Mar. 21, 2013

(30) Foreign Application Priority Data
May 31, 2010 (JP) .................................. 2010-124823
May 16, 2011 (JP) .................................. 2011-109105

(51) Int. Cl.
$H01M\ 4/133$ (2010.01)
$H01M\ 4/62$ (2006.01)
(Continued)

(52) U.S. Cl.
CPC ......... $H01M\ 4/133$ (2013.01); $H01M\ 4/0404$ (2013.01); $H01M\ 4/1393$ (2013.01);
(Continued)

(58) Field of Classification Search
None
See application file for complete search history.

(56) References Cited

U.S. PATENT DOCUMENTS 6,730,404 B1  5/2004  Suzuki et al.
7,476,467 B2  1/2009  Park et al.
(Continued)

FOREIGN PATENT DOCUMENTS

CN  1296646 A     5/2001
CN  101295802 A  10/2008
(Continued)

OTHER PUBLICATIONS http://www.merriam-webster.com/dictionary/binder. 2014.*
(Continued)

*Primary Examiner* — Patrick Ryan
*Assistant Examiner* — Christopher Domone
(74) *Attorney, Agent, or Firm* — Foley & Lardner LLP

(57) ABSTRACT

A negative electrode for a secondary battery according to the present invention has a collector and a negative electrode active material layer formed on a surface of the collector and containing negative electrode active material particles. In the negative electrode active material layer, an insulating material is arranged between the negative electrode active material particles so as not to develop conductivity by a percolation path throughout the negative electrode active material layer. It is possible in this configuration to effectively prevent the occurrence of a short-circuit current due to an internal short circuit and the generation of heat due to (Continued)

such short-circuit current flow in the secondary battery while securing the battery performance of the secondary battery.

15 Claims, 4 Drawing Sheets

(51) Int. Cl.
*H01M 4/1393* (2010.01)
*H01M 4/64* (2006.01)
*H01M 4/04* (2006.01)
*H01M 4/587* (2010.01)
*H01M 4/66* (2006.01)
*H01M 4/02* (2006.01)

(52) U.S. Cl.
CPC ............ *H01M 4/587* (2013.01); *H01M 4/62* (2013.01); *H01M 4/621* (2013.01); *H01M 4/64* (2013.01); *H01M 4/668* (2013.01); *H01M 4/02* (2013.01); *Y02P 70/54* (2015.11); *Y10T 29/49115* (2015.01)

(56) References Cited

U.S. PATENT DOCUMENTS

| | | | |
|---|---|---|---|
| 7,541,113 B2 | 6/2009 | Partington | |
| 7,749,653 B2 | 7/2010 | Wakita et al. | |
| 7,759,004 B2 | 7/2010 | Ikuta et al. | |
| 7,998,266 B2 | 8/2011 | Morimitsu et al. | |
| 8,445,139 B2 | 5/2013 | Hosaka et al. | |
| 8,518,577 B2 | 8/2013 | Lim et al. | |
| 2002/0110732 A1* | 8/2002 | Coustier et al. | 429/144 |
| 2004/0072074 A1 | 4/2004 | Partington | |
| 2005/0271943 A1 | 12/2005 | Park et al. | |
| 2007/0072083 A1 | 3/2007 | Ikuta et al. | |
| 2007/0172733 A1 | 7/2007 | Minami et al. | |
| 2007/0178380 A1* | 8/2007 | Iwanaga et al. | 429/231.4 |
| 2007/0218362 A1* | 9/2007 | Nagasaki et al. | 429/231.3 |
| 2007/0264575 A1 | 11/2007 | Wakita et al. | |
| 2008/0220330 A1* | 9/2008 | Hosaka et al. | 429/209 |
| 2009/0017082 A1 | 1/2009 | Morimitsu et al. | |
| 2009/0098458 A1* | 4/2009 | Fujii | H01M 4/02 429/209 |
| 2009/0208843 A1 | 8/2009 | Partington | |
| 2009/0311588 A1 | 12/2009 | Lim et al. | |
| 2010/0055565 A1 | 3/2010 | Naoi et al. | |
| 2013/0316220 A1 | 11/2013 | Lim et al. | |

FOREIGN PATENT DOCUMENTS

| | | |
|---|---|---|
| CN | 100483831 C | 4/2009 |
| CN | 101507019 A | 8/2009 |
| CN | 101604765 A | 12/2009 |
| CN | 101626099 A | 1/2010 |
| CN | 101635351 A | 1/2010 |
| EP | 2 133 941 A1 | 12/2009 |
| JP | 07-220759 A | 8/1995 |
| JP | 2005-174792 A | 6/2005 |
| JP | 3856074 B2 | 12/2006 |
| JP | 2007-213930 A | 8/2007 |
| JP | 2007-305545 A | 11/2007 |
| JP | 2008-27879 A | 2/2008 |
| JP | 2008-041465 A | 2/2008 |
| JP | 2010-061912 A | 3/2010 |
| JP | 2010-073500 A | 4/2010 |
| RU | 2 295 803 C2 | 3/2007 |
| RU | 2 315 395 C1 | 1/2008 |
| RU | 2 356 602 C1 | 5/2009 |
| WO | WO 2007/094253 A1 | 8/2007 |

OTHER PUBLICATIONS

Korean Office Action, Apr. 15, 2014, 10 pages.
Russian Office Action with English Language Translation dated Mar. 4, 2014 (13 pgs.).
Chinese Office Action dated Jul. 28, 2014, 10 pgs.

* cited by examiner

NEGATIVE ELECTRODE FOR SECONDARY BATTERY, AND PROCESS FOR PRODUCTION THEREOF

FIELD OF THE INVENTION

The present invention relates to a negative electrode for a secondary battery and a process for production of the negative electrode.

BACKGROUND ART

In recent years, the reduction of $CO_2$ emissions has been sincerely desired in order to address global warming. The automotive industry has a growing expectation on the introduction of electric vehicles (EV) and hybrid electric vehicles (HEV) for the reduction of $CO_2$ emissions and has been intensively working on the development of motor-driving secondary batteries, which become key to the practical application of these electric vehicles.

The motor-driving secondary batteries are required to have very high output characteristics and high energy as compared to consumer lithium-ion secondary batteries for mobile phones, notebook computers etc. Attentions are being given to lithium-ion secondary batteries having relatively high theoretical energy among all batteries. The development of such lithium-ion secondary batteries has been pursued rapidly at present.

In general, the lithium-ion secondary battery includes a positive electrode in which a positive electrode active material is applied with the use of a binder etc. onto both sides of a positive electrode collector and a negative electrode in which a negative electrode active material is applied with the use of a binder etc. onto both sides of a negative electrode collector. These positive and negative electrodes are connected to each other via an electrolyte-impregnated separator and accommodated in a battery case.

One of problems for the practical use of the secondary batteries such as lithium-ion secondary batteries is that, for some reason, a so-called internal short circuit occurs between the positive and negative electrode active material layers even through the positive and negative electrode active material layers are separated from each other by the separator. The occurrence of an internal short circuit in the battery leads to the continuous flow of an electric current through a power generating element of the battery even though the battery has no connection to an external load. This becomes a cause of heat generation in the battery and, in some cases, causes an adverse effect on the performance of the battery. It has been demanded to develop techniques for effectively preventing such a problem of internal short circuit and heat generation. Under present circumstances, however, there have not yet been established any adequate solution to the problem of internal short circuit and heat generation. It is necessary in the development of the techniques for preventing the problem of internal short circuit and heat generation not to cause an adverse effect on the performance of the battery in view of the fact that the battery is in need of further performance improvements.

On the other hand, Patent Document 1 discloses a technique for forming a negative electrode active material layer of a lithium-ion secondary battery with the use of a carbon negative electrode active material containing nanoparticles of ceramic material such as alumina. It is conventionally likely that, when the thickness of the negative electrode active material layer becomes increased for improvement in the energy density of the lithium-ion secondary battery, deposition of lithium metal will occur with increase in the charge density of the negative electrode. The technique of Patent Document 1 is intended to solve such a lithium deposition problem and is not intended to prevent the above-mentioned problem of internal short circuit and heat generation.

PRIOR ART DOCUMENTS

Patent Document

Patent Document 1: Japanese Laid-Open Patent Publication No. 2007-305545

SUMMARY OF THE INVENTION

It is accordingly an object of the present invention to provide a technique for effectively preventing the occurrence of a short-circuit current due to an internal short circuit and the occurrence of heat generation due to such a short-circuit current in a secondary battery while maintaining the performance of the secondary battery.

According to the present invention, there is provided a negative electrode for a secondary battery, comprising: a collector; and a negative electrode active material layer formed on a surface of the collector and containing negative electrode active material particles, wherein the negative electrode active material layer further contains an insulating material arranged between the negative electrode active material particles so as to prevent develop of conductivity by a percolation path throughout the negative electrode active material layer.

The negative electrode for the secondary battery according to the present invention does not develop conductivity by a percolation path throughout the negative electrode active material layer even in the occurrence of an internal short circuit. It is therefore possible to effectively prevent the occurrence of a short-circuit current due to an internal short circuit and the occurrence of heat generation due to such a short-circuit current in the battery. It is also possible to secure the sufficient performance of the battery as there is only a slight increase caused in the electrical resistance of the negative electrode itself in the present invention.

DESCRIPTION OF EMBODIMENTS

Figure 1:
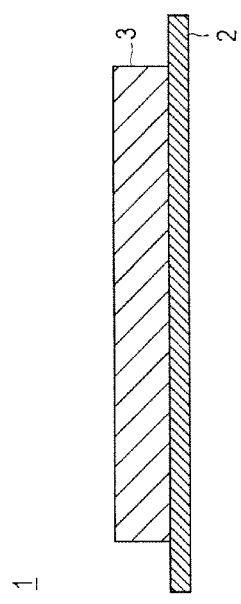
FIG. 1 is a schematic section view of a negative electrode of a lithium-ion secondary battery according to one exemplary embodiment of the present invention.

First, the basis of which the present invention has been made by the present inventors will be briefly described below. It is herein noted that: the following description about the mechanism of the present invention may be partly based on assumptions; and the technical scope of the present invention is not limited to the following mechanism.

Against the above-mentioned problem of internal short circuit and heat generation, the present inventors have attempted to prevent the intensive flow of a short-circuit current to the region of occurrence of an internal short circuit by reducing the electrical resistance of the collector in the power generating element of the battery. For example, the present inventors have made an attempt to use a metal collector with a decreased thickness in the battery and thereby blow out the region of occurrence of an internal short circuit by the generation of Joule's heat due to a short-circuit current for the purpose of prevention of further short-circuit current. This attempt is very effective and is having some measure of success to solve the problem of internal short circuit and heat generation.

In recent years, there has been intensively developed a battery (bipolar secondary battery) including a power generating element with an electrode (bipolar electrode) in which active material layers of different positive and negative polarities are formed on opposite sides of collector for the purpose of improvement in the output of the secondary battery. The power generating element of the bipolar secondary battery has such a structure that electric cell units are connected in series via an electrode surface so as to cause the flow of an electric current through the power generating element in a direction of lamination of the electric cell units during use of the bipolar secondary battery. For the purpose of reduction in the weight of the second battery, there has also recently been proposed a so-called "resin collector" by the use of a resin material in place of a metal material as the material of the collector in the power generating element. The resin collector is formed of a conductive resin base material having dispersed therein a conductive filler or formed with a resin layer of conductive resin material.

The present inventors have made studies on the occurrence of an internal short circuit in the battery to which the above two techniques are applied in combination (that is, the bipolar secondary battery with the resin collector). As the resin collector itself has a much higher electrical resistance than that of the conventional metal collector, it seems easier to prevent the flow of a short-circuit current due to an internal short circuit in the bipolar secondary battery with the resin collector than in the bipolar secondary battery with the metal collector. As a result of studies, however, the present inventors have observed a phenomenon contrary to the above conventional technical common knowledge, i.e., found that a short-circuit current keeps on flowing in the occurrence of an internal short circuit in the bipolar secondary battery with the resin collector as is the case with the bipolar secondary battery with the metal collector.

The present inventors have made further studies on the cause of the above phenomenon and have found out that, in the bipolar battery with the resin collector, the short-circuit current keeps on flowing through the medium of the negative electrode active material layer in the occurrence of the internal shirt circuit.

Some exemplary embodiments of the present invention, which have been accomplished as a result of researches based on the above findings, will be hereinafter described below with reference to the drawings. In the drawings, like parts and portions are designated by like reference numerals to omit repeated explanations thereof; and the dimensions of the respective parts and portions may be exaggerated for purposes of illustration and may be different from the actual dimensions.

Negative Electrode

First Embodiment

FIG. 1 is a schematic section view of a negative electrode for a lithium-ion secondary battery according to one exemplary embodiment (first embodiment) of the present invention. The negative electrode for the lithium-ion secondary battery shown in FIG. 1 will be explained below by way of example, but is intended to limit the technical scope of the present invention thereto.

As shown in FIG. 1, negative electrode 1 includes collector 2 and negative electrode active material layer 3 formed on a surface of collector 2 and containing negative electrode active material particles (not shown). The respective structural parts of negative electrode 1 according to the present embodiment will be explained below. Negative electrode 1 is not however limited to the following configuration and can adopt any conventionally known configuration.

(Collector)

The collector is formed of a conductive material. The active material layer is arranged on one side or both sides (commonly, both sides) of the collector. There is no particular limitation on the material of the collector. As the material of the collector, there can be used a metal material, a conductive polymer material or a conductive resin (resin collector) in which a conductive filler is added to a nonconductive polymer material.

Examples of the metal material are aluminum, nickel, iron, stainless steel, titanium and copper. In addition, there can suitably be used a clad material of nickel and aluminum, a clad material of copper and aluminum and a plating material of combination of these metals. A foil material having a metal surface coated with aluminum is also usable. In terms of electron conductivity and battery operation potential, aluminum, stainless steel and copper are preferred.

Examples of the conductive polymer material are polyaniline, polypyrrole, polythiophene, polyacetylene, polyparaphenylene, polyphenylene vinylene, polyacrylonitrile and polyoxadiazole. These conductive polymer materials have sufficient conductivity without the addition of a conductive filler and thus are advantageous in terms of ease of manufacturing and reduction of collector weight.

Examples of the nonconductive polymer material are polyethylene (PE: high-density polyethylene (HDPE), low-density polyethylene (LDPE)), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethylacrylate (PMA), polymethylmethacrylate (PMMA), polyvinyl chloride (PVC), polyvinylidene fluoride (PVdF) and polystyrene (PS). These nonconductive polymer materials have good potential resistance and solvent resistance.

The conductive filler is added to the conductive polymer material and to the nonconductive polymer material as needed. In the case where the nonconductive polymer material is used alone as the base resin of the collector, the conductive filler is essential in order to impart conductivity to the resin. There is no particular limitation on the conductive filler as long as the conductive filler is any material having conductivity. As the filler with good conductivity, potential resistance and lithium-ion shielding property, a metal material or a conductive carbon material can be used. There is no particular limitation on the metal material. The metal material preferably includes at least one kind of metal selected from the group consisting of Ni, Ti, Al, Cu, Pt, Fe, Cr, Sn, Zn, In, Sb and K, or an alloy or metal oxide containing any of these metals. There is no particular limitation on the conductive carbon material. The conductive carbon material preferably includes at least one kind selected from the group consisting of Acetylene Black, Vulcan, Black Pearl, carbon nanofibers, Ketjen Black, carbon nanotubes, carbon nanohorns, carbon nanoballons and fullerene. There is no particular limitation on the amount of the conductive filler as long as the conductive filler is added in such an amount as to impart sufficient conductivity to the collector. In general, the content amount of the conductive filler in the polymer material is 5 to 35 mass %. In order to more effectively exert the effects of the present embodiment, the collector is preferably a resin collector.

The size of the collector is determined depending on the purpose of use of the battery. For example, the collector is made large in area for use in the large-size battery where high energy density is required. There is no particular limitation on the thickness of the collector. The thickness of the collector is generally of the order of 1 to 100 μm.

(Negative Electrode Active Material Layer)

Negative electrode active material layer 3 contains negative electrode active material particles and, optionally, a conventionally known additive or additives. Examples of the conventionally known additive are a conductive agent for improvement in electrical conductivity, a binder, an electrolyte (polymer matrix, ion-conductive polymer, electrolytic solution), an electrolyte support salt (lithium salt) and the like.

The negative electrode active material particles have a composition that releases ions during discharging and absorbs ions during charging. There is no particular limitation on the negative electrode active material particles as long as the negative electrode active material particles are particles of any material capable of reversibly absorbing and releasing lithium. Preferred examples of the negative electrode active material particles are particles of carbon materials such as natural graphite, synthetic graphite, carbon black, activated carbon, carbon fiber, coke, soft carbon and hard carbon, metals such as Si and Sn, metal oxides such as TiO, $Ti_2O_3$, $TiO_2$, $SiO_2$, SiO and $SnO_2$, lithium-transition metal composite oxides such as $Li_{4/3}Ti_{5/3}O_4$ and $Li_7MnN$, Li—Pb alloys, Li—Al alloys and Li. In order to sufficiently exert the effects of the present embodiment, the negative electrode active material preferably contains a conductive material such as carbon, metal or alloy, more preferably carbon. The negative electrode active material particles can be of one kind or two or more kinds. The effects of the present embodiment, by which it is possible to prevent the continuous flow of a short-circuit current due to the occurrence of an internal short circuit, become more pronounced when the negative electrode active material contains a conductive material such as carbon.

There is no particular limitation on the average particle size (median size) of the negative electrode active material particles. In terms of high capacity, reactivity and cycle resistance of the negative electrode active material, the average particle size of the negative electrode active material particles is preferably in a range of 1 to 100 μm, more preferably 5 to 30 μm. When the average particle size of the negative electrode active material particles is in the above range, it is possible to prevent an increase in the internal resistance of the secondary battery during charging/discharging under high-output conditions and take a sufficient current out of the secondary battery. The average particle size (median size) of the negative electrode active material particles can be determined by laser diffraction analysis. The form of the negative electrode active material particles is varied depending on the kind or production method of the negative electrode active material. The negative electrode active material particles can be in, but are not limited to, spherical form, plate form, acicular form, columnar form, horn form or the like. Preferably, the negative electrode active material particles are in spherical form. When the negative electrode active material particles are in spherical form, it is possible to decrease edge surfaces between the active material particles, uniformly adhere an insulating material by spot application to surfaces of the active material particles and control the internal resistance of the electrode by a small amount of insulating material.

Figure 2:
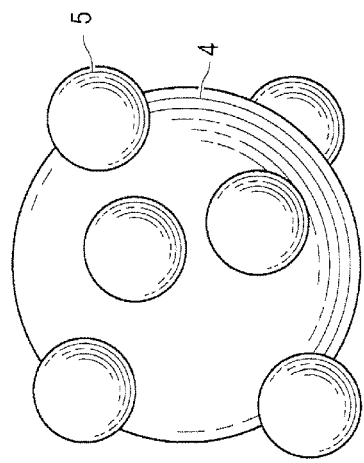
FIG. 2 is a schematic view showing the state of active material particles in the negative electrode according to a first embodiment of the present invention.

FIG. 2 is a schematic view showing the state of the negative electrode active material particles according to the present embodiment. As shown in FIG. 2, the present embodiment is characterized in that particles of the insulating material (more specifically, alumina particles 5) are spot-applied to the surfaces of negative electrode active material particles 4. The spot application of the insulating material to the surfaces of negative electrode active material particles 4 can be done by means of the spot applicability of the insulating material itself where possible, or can be done via a binder (not shown). There is no particular limitation on the binder used to secure the spot application of the insulating material. It is feasible to use any binder conventionally known in the technical field of battery technology. Examples of such a binder are carboxymethyl cellulose (CMC), polyvinylidene fluoride (PVdF), polytetrafluoroethylene (PTFE), polyvinyl acetate (PVA), polyimide (PI), acrylic resin, epoxy resin, polyurethane resin, urea resin and styrene-butadiene rubber (SBR). Among others, CMC is preferred as the spot application binder in the present embodiment. The CMC is particularly preferably of the type whose 1 mass % aqueous solution has a viscosity of 5 to 1000 mPa·s. It is possible by the use of such a CMC binder to prevent adhesion and aggregation between the insulating material particles and allow efficient spot application of the insulating material particles to the surfaces of the negative electrode active material particles. The above viscosity of the 1 mass % CMC aqueous solution is a value measured at 25° C. by a B-type viscometer.

In the present embodiment, alumina particles 5 are adhered by spot application to the surfaces of negative electrode active material particles 4 and thereby arranged between negative electrode active material particles 4 so as to prevent developing conductivity by a percolation path throughout negative electrode active material layer 3. This feature will be explained in more detail below.

In the case of a multiple component system in which a conductive material and an insulating material are mixed together, some regions (clusters) in which the conductive material is high in content generally appear locally as the content ratio of the conductive material relative to the insulating material increases. In microscopic observation, each of the clusters allows therein the flow of electrons (electric current) between particles of the conductive material by the tunnel effect. This phenomenon is known as "percolation". The conduction path caused by percolation is referred to as "percolation path". On the other hand, the tunnel effect does not act between the clusters because the clusters are separated from one another by the insulating material. The conductivity due to the conduction path is thus limited to the inside of each cluster and is not developed throughout the system. As the relative content ratio of the conductive material further increases and reaches a given level (percolation threshold), it looks as if the cluster of infinite size appears to induce percolation throughout the system. When electrons (electric current) enter into the system in such a state, the flow of these electrons (electric current) takes place throughout the system. This leads to a sudden increase in the conductivity throughout the system.

In view of the demand to minimize the overall internal resistance of the battery, it has been common technical practice to, if possible, decrease the internal resistance of the negative electrode active material layer at the time of filing the present application. Conventionally, the insulating material is thus not added between the negative electrode active material particles or added between the negative electrode active material particles in a much smaller amount than that of the present invention. In consequence, the content ratio of the negative electrode active material particles as the conductive material in the system (negative electrode active material layer) is conventionally so high that the conductivity is developed by a percolation path throughout the system (negative electrode active material layer). The present inventors have found out that the development of conductivity by such a percolation path throughout the system becomes a cause of the continuous flow of a short-circuit current. In other words, the electrical resistance of the conventional negative electrode active material layer is too low to prevent the occurrence and continuous flow of a short-circuit current due to an internal short circuit in the battery. Even in the above-mentioned technique of Patent Document 1, the nanoparticles are simply mixed and dispersed in the negative electrode active material layer so that the negative electrode active material layer has low electrical resistance and thus presents a possibility of continuous flow of a short-circuit current in the occurrence of an internal short circuit in the battery.

In the present embodiment, by contrast, the content ratio of the insulating material (alumina particles 5) relative to the conductive material (negative electrode active material particles 4) in the multiple component system (negative electrode active material layer 3) is set higher than the conventional level (that is, the insulating material is present in a larger amount than the percolation threshold level) so as not to develop the conductivity by the percolation path throughout negative electrode active material layer 3. Even in the occurrence of an internal short circuit in the battery, the flow of a short-circuit current can be limited to the inside of the cluster. The battery can be effectively prevented from heat generation due to such short-circuit current flow.

As mentioned above, it is possible in the present embodiment to obtain the unexpected effects for the prevention of short-circuit current flow through negative electrode active material layer 3 by intentionally increasing the content ratio of the insulating material in negative electrode active material layer 3 to be higher than the conventional level. The above effects can be obtained by a very simple method of controlling the content ratio of the component materials in the negative electrode active material layer in the present invention. The technical idea of the present invention is intended to obtain the above good effects by control of the parameter irrelevant to the structure of the negative electrode active material layer or the other electrode body itself and is particularly advantageous over the prior art. Further, the prevent inventors have surprisingly have found out for the first time as an important factor that, even when the content ratio of the insulating material becomes increased to a level required to solve the problem of occurrence of a short-circuit current, there arises only a very small influence on the overall electrical resistance of the battery. For example, the overall internal resistance of the battery increases only by 0.5% when the electron resistance of negative electrode active material layer 3 becomes increased to 100-fold. The reason for this is assumed to be that many of the negative electrode active material particles are located adjacent to each other via the insulating material (alumina particles) so as to allow efficient diffusion of lithium ions in negative electrode active material layer 3. The technical solution of the present embodiment can thus adapt to the demand to secure the performance of the battery equivalent to conventional one.

In negative electrode active material layer 3, it is feasible to judge by the following procedure whether the insulating material is arranged between the negative electrode active material particles so as not to develop the conductivity by the percolation path throughout the negative electrode active material layer. Using the same materials as those of the negative electrode active material layer, a graph is plotted with the relative content ratio of the insulating material and the conductive material (negative electrode active material) being taken as the vertical axis and the parameter (such as volume resistivity) indicative of the conductivity being taken as the horizontal axis. Based on this graph, the relative content ratio corresponding to the percolation threshold is determined. It is judged that the above requirement is satisfied when the insulating material is contained in the negative electrode active material layer in an amount of weight fraction (parts by weight) exceeding the percolation threshold (i.e. in such an amount as not to develop the conductivity by the percolation path throughout the negative electrode active material layer).

In the present embodiment, the electron resistance of negative electrode active material layer 3 is set relatively higher than the conventional level. It is however difficult to uniquely define the specific measure of the electron resistance of negative electrode active material layer 3 as the form of negative electrode active material layer 3 is varied depending on the kinds and content ratio of the component materials in negative electrode active material layer 3. In the case of using the negative electrode in the after-mentioned bipolar battery (notably, in combination with the resin collector), it is effective to define the electron resistance of the negative electrode relative to the electron resistance of the other structural part of the bipolar battery. For example, the volume resistivity of negative electrode active material layer 3 is 0.1 to 100 times the lower one of the volume resistivity of the collector and the volume resistivity of the positive electrode active material layer. In this case, it is possible to effectively prevent the occurrence of a short circuit between the electrode active material layers even if the collectors come into contact with each other. In comparison between the negative electrode active material layer and the positive electrode active material layer, the volume resistivity of the negative electrode active material layer is preferably 0.1 to 1 time the volume resistivity of the positive electrode active material layer. It is possible to, while limiting a deterioration in the performance of the battery, more effectively prevent the occurrence of a short-circuit current through the negative electrode active material layer as well as the occurrence of heat generation in the battery as the electron resistance of the negative electrode active material layer is close to the electron resistance of the positive electrode active material. Herein, the volume resistivity can be measured by the method as in the aftermentioned examples.

It is feasible in the present embodiment to adopt any configuration other than the above. For example, any metal oxide other than alumina can be used as the insulating material. Examples of the metal oxide other than alumina are silica, zirconia, magnesia and titania. Further, a resin can also be used in place of the metal oxide as the insulating material. Examples of the resins usable as the insulating material are polyethylene, polypropylene, polyethylene terephthalate, polybutylene terephthalate, polyamide, polyamideimide, polyimide, liquid crystalline polymer, polyphenylene sulfide, polytetrafluoroethylene, polyetheretherketone, perfluoroalkylvinylether and polyoxymethylene. The above insulating materials can be used solely or in combination of two or more thereof. The metal oxide and the resin may be used in combination. These metal oxides and resins are available for general purpose use as the insulating material and thus have the advantage of low cost and ease of handling. It is possible to easily control the conductivity and insulating property of negative electrode active material layer 3 as desired by the use of such an insulating material in the present embodiment.

In the present embodiment where the insulating material is in particle form, the average particle size (median size) of the insulating material (alumina particles 5) is preferably in a range of 0.1 to 5 µm. The insulating material can be used even when average particle size of the insulating material is out of this range. The average particle size of the insulating material is more preferably 0.3 to 4 µm. Alternatively, it is preferable that the average particle size (median size) of the insulating material is smaller than or equal to one quarter of the average particle size of the negative electrode active material particles such that the appropriate amount of insulating material (alumina particles) can be spot-applied to the surfaces of negative electrode active material particles 4 so as to effectively prevent the continuous flow of a short-circuit current due to an internal short circuit. The particle form of the insulating material (alumina particles 5) is varied depending on the kind or production method of the insulating material. The particles of the insulating material can be in, but are not limited to, spherical form, plate form, acicular form, columnar form, horn form or the like. Preferably, the particles of the insulating material are in spherical form.

The content amount of the insulating material in negative electrode active material layer 3 is determined as appropriate, depending on the forms of the negative electrode active material and the insulating material, in such a manner as not to develop the percolation path throughout the active material layer. Although it is difficult to uniquely determine the content amount of the insulating material in negative electrode active material layer 3, the content amount of the insulating material in negative electrode active material layer 3 is preferably 1 to 40 mass %, more preferably 3 to 30 mass %, relative to 100 mass % of the negative electrode active material particles. When the content amount of the insulating material is in the above range, it is possible to not only prevent the flow of a short-circuit current but also maintain the high capacity of the battery after aging.

As mentioned above, negative electrode active material layer 3 may contain any conventionally known additive component other than the above components in the present embodiment. As such an additive component, a binder, an electrolyte, a lithium salt and the like are usable. The binder performs the function of a binding agent to bind the negative electrode active material particles with the insulating material spot-applied thereto in the present embodiment. There is no particular limitation on the binder. Examples of the binder are the same as those explained above as the spot application binder. Among others, preferred is polyvinylidene fluoride (PVdF) as the binder for binding the negative electrode active material particles but not as the spot application binder.

Examples of the electrolyte are, but are not limited to, ion-conductive polymers (solid polymer electrolytes) in which polyethylene oxide (PEO), polypropylene oxide (PPO) or copolymers thereof etc. are doped with lithium ions. Examples of the lithium salt are, but are not limited to, inorganic acid anion salts such as $LiPF_6$, $LiBF_4$, $LiClO_4$, $LiAsF_6$, $LiTaF_6$, $LiAlCl_4$ and $Li_2B_{10}Cl_{10}$ and organic acid anion salts such as $LiCF_3SO_3$, $Li(CF_3SO_2)_2N$ and $Li(C_2F_5SO_2)_2$. The above additive components such as binder, electrolyte and lithium salt can be used solely or in combination of two or more thereof.

There is no particular limitation on the thickness of negative electrode active material layer 3. The thickness of negative electrode active material layer 3 is determined as appropriate in the light of common knowledge about lithium-ion secondary batteries and is, for example, of the order of 2 to 100 µm.

Production Process of Negative Electrode

First Embodiment

There is no particular limitation on the production process of the negative electrode for the secondary battery according to the present embodiment. It is feasible to produce the negative electrode by any conventionally known process. The production process of the negative electrode according to the present embodiment will be explained below by way of example.

In the present production process, the negative electrode active material particles are first mixed with the insulating material so as to thereby adhere the insulating material by spot application to at least part of the surfaces of the negative electrode active material particles. There are thus obtained complexes of the negative electrode active material particles with the insulting material (first step). Specific kinds and forms of the materials (negative electrode active material particles, insulating material) used in this step are as mentioned above. The detailed explanation of the materials used in this step will thus be omitted herefrom. There is no particular limitation on the means for spot application of the insulating material to the surfaces of the negative electrode active material particles. The spot application can be done by dry technique with the use of e.g. Hybridization System (manufactured by Nara Machinery Co., Ltd.), Kosmos (manufactured by Kawasaki Heavy Industries Ltd.), Mechanofusion (Hosokawa Micron Ltd.), Therfusing System (manufactured by Nippon Pneumatic Mfg. Co., Ltd.), Mechanomill, Speed Kneader, Speed Mill or Spiracoater (each manufactured by Okada Seiko Co., Ltd.). In some cases, the spot application may be done by simply mixing the negative electrode active material particles and the insulating material without the use of any special equipment.

The spot application can alternatively be done by wet technique and, more preferably, mixing the negative electrode active material particles with the insulating material in the coexistence of the spot application binder and solvent in the system. Specific examples of the spot application binder are those as mentioned above. Among others, CMC is preferably used as the spot application binder. There is no particular limitation on the solvent used. In the present invention, water is preferably used as the solvent.

Another alternative technique for spot application of the insulating material to the surfaces of the negative electrode active material particles is to prepare a solution in which the binder and the insulating material are dissolved or dispersed in the solvent such as water, and then, apply by spraying etc. the prepared solution to the negative electrode active material particles. This spot application technique is preferred in terms of manufacturing advantage of less equipment constraints such as explosion-proof enclosure. There can be used a rolling flow coating machine such as Multiplex Processor (manufactured by Powrex Corporation) in this spot application technique.

There is no particular limitation on the content ratio of the respective component materials in the first step. The content ratio of the respective component materials is adjusted as appropriate in such a manner that the desired amount of insulating material can be spot-applied to the surfaces of the negative electrode active material particles.

Subsequently, a negative electrode active material slurry is obtained by mixing the complexes of the negative electrode active material particles and the insulating material prepared in the first step with the binder and solvent (second step). Specific kind and form of the binder are those as mentioned above. Among others, PVdf is preferably used as the binder. There is no particular limitation on the solvent used. Any slurry viscosity adjusting solvent used for battery manufacturing can be selected as appropriate in the light of common knowledge. For example, N-methyl-2-pyrrolidone is preferably used.

In the case of using the additive component such as electrolyte or lithium salt in the negative electrode active material layer, the additive component is added into the slurry in the second step. There is no particular limitation on the content ratio of the respective component materials in the slurry. The content ratio of the respective component materials is appropriately adjusted to a desired level in such a manner that the resulting negative electrode can exert the above-mentioned effects.

The negative electrode active material slurry obtained in the second step is then applied to the surface of the collector and dried, thereby forming the negative electrode active material layer on the surface of the collector (third step).

The detailed explanation of the kind and form of the collector will be omitted herefrom since the kind and form of the collector have already been explained above. There is no particular limitation on the means for application of the negative electrode active material slurry to the collector. The negative electrode active material slurry can be applied to the collector by any ordinary means such as self-running coater, doctor blade process or spraying process. By drying the slurry coating applied to the surface of the collector, the solvent can be removed from inside the slurry coating. There is also no particular limitation on the means for drying the slurry coating. The slurry coating can be dried by any appropriate means in the light of common knowledge about electrode manufacturing. One example of the drying means is heat treatment. The drying conditions (such as drying time and drying temperature) are set as appropriate depending on the application amount of the slurry and the volatilization rate of the slurry viscosity adjusting solvent. The dried coating may be subjected to pressing in order to adjust the density, porosity and thickness of the electrode. The pressing may be conducted before the drying. In this way, the negative electrode active material layer is formed on the surface of the collector.

It is possible by the above production process to produce the negative electrode for the secondary battery according to the present embodiment with a simple procedure under precise control.

Negative Electrode

Second Embodiment

Referring to FIG. 1, negative electrode 1 for a secondary battery according to a second embodiment of the present invention is similar to that according to the first embodiment in that an insulating material is arranged between negative electrode active material particles in negative electrode active material layer 3. In such a configuration, the negative electrode does not develop conductivity by a percolation path throughout the negative electrode active material layer in the second embodiment as in the case of the first embodiment.

Figure 3:
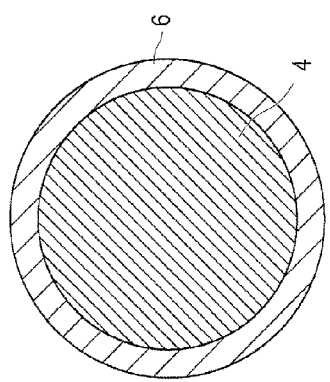
FIG. 3 is a schematic view showing the state of active material particles in the negative electrode according to a second embodiment of the present invention.

FIG. 3 is a schematic view showing the state of the negative electrode active material particles according to the present embodiment. As shown in FIG. 3, the present embodiment is characterized in that a coating of the insulating material (more specifically, alumina coating 6) is applied to the surfaces of negative electrode active material particles 4. In FIG. 3, the coating is illustrated as if it is applied to the entire surfaces of negative electrode active material particles 4. The coating is not however limited to this application form. It suffices to apply the coating to at least part of the surfaces of negative electrode active material particles. The degree of coverage of the negative electrode active material particles by the coating is appropriately adjusted depending on the desired effects.

In the present embodiment, alumina coating 6 is applied to the surfaces of negative electrode active material particles 4 and thereby arranged between negative electrode active material particles 4 so as not to develop the conductivity by the percolation path throughout negative electrode active material layer 3. Since the effects, development mechanism and judgment procedure of this feature are the same as those of the first embodiment, the detailed explanation thereof will be omitted herefrom.

The preferable volume resistivity range of negative electrode active material layer 3 is also the same as that of the first embodiment.

It is feasible in the present embodiment to adopt any configuration other than the above. For example, the same metal oxide and/or resin as explained above in the first embodiment can be used as the insulating material.

In the present embodiment, the thickness of the coating of the insulating material (alumina coating 6) is preferably in a range of 1 to 500 nm in order to effectively prevent the occurrence of a short-circuit current due to an internal short circuit. The coating can be used even when the thickness of the coating is out of this range. From the above perspective point, the thickness of the coating is more preferably 10 to 500 nm. On the other hand, the thickness of the coating is preferably 100 nm or smaller, more preferably 50 nm or smaller, in order to secure the capacity of the battery after aging.

The content amount of the insulating material in negative electrode active material layer 3 is determined as appropriate, depending on the forms of the negative electrode active material and the insulating material, in such a manner as not to develop the percolation path throughout the active material layer. Differently from the first embodiment in which the particles of the insulating material are spot-applied to the negative electrode active material particles, the coating of the insulating material is applied to the surfaces of the negative electrode active material particles in the present embodiment. It is thus possible in the second embodiment to prevent the percolation path from being developed throughout the active material layer even when the content amount of the insulating material is relatively smaller than that in the first embodiment. For this reason, the content amount of the metal oxide as the insulating material in negative electrode active material layer 3 is preferably 0.1 to 20 mass %, more preferably 1 to 20 mass %, relative to 100 mass % of the negative electrode active material particles. In order to secure the capacity of the battery after aging, the content amount of the metal oxide as the insulating material is preferably 1 to 5.5 mass %, more preferably 1 to 3 mass %, relative to 100 mass % of the negative electrode active material particles. On the other hand, the content amount of the resin as the insulating material in negative electrode active material layer 3 is preferably 0.5 to 30 mass %, preferably 1 to 5 mass %, relative to 100 mass % of the negative electrode active material particles. In this case, it is possible to appropriately control the conductivity and insulating property of negative electrode active material layer 3 while minimizing an increase in the reaction resistance of negative electrode active material layer 3 and a decrease in the lithium-ion conductivity of negative electrode active material layer 3 caused by such a reaction resistance increase.

In the present embodiment, negative electrode active material layer 3 may contain any conventionally known additive or additives such as a binder as in the case of the first embodiment. Further, the preferable thickness range of negative electrode active material layer 3 is the same as that of the first embodiment.

Production Process of Negative Electrode

Second Embodiment

There is no particular limitation on the production process of the negative electrode for the secondary battery according to the present embodiment. It is feasible to produce the negative electrode by any conventionally known process. The production process of the negative electrode according to the present embodiment will be explained below by way of example.

The production process of the negative electrode according to the present embodiment is different in the first step from that according to the first embodiment. In the first embodiment, the insulating material is spot-applied to the surfaces of the negative electrode active material particles by mixing the negative electrode active material particles with the insulating material in the first step. On the other hand, the coating of the insulating material is applied to the surfaces of the negative electrode active material particles by mixing the negative electrode active material particles with the insulating material in the first step in the second embodiment. Specific kinds and forms of the materials (negative electrode active material particles, insulating material) used in this step are as mentioned above. The detailed explanation of the materials used in this step will thus be omitted herefrom. There is no particular limitation on the means for applying the coating of the insulating material to the surfaces of the negative electrode active material particles. The coating can be applied by dry technique such as chemical vapor deposition (CVD), physical vapor deposition (PVD), pulse laser deposition (PLD) or sputtering process. The coating application can alternatively be done by wet technique. Another alternative coating application technique is to apply a plating (coating) of the insulating material to the surfaces of the negative electrode active material particles as disclosed in International Patent Application Publication No. WO 2007/094253 (see Examples 3-1 to 3-5).

There is no particular limitation on the content ratio of the respective component materials in the first step. The content ratio of the respective component materials is adjusted as appropriate in such a manner that the coating of the insulating material can be applied in the desired amount (thickness) onto the surfaces of the negative electrode active material particles.

Using the complexes of the negative electrode active material particles and the insulating material obtained in the first step, a negative electrode active material slurry is prepared (second step). The prepared negative electrode active material slurry is then applied to the surface of the collector and dried, thereby forming the negative electrode active material layer on the surface of the collector (third step). In the present embodiment, the second and third steps are the same as those in the first embodiment. The detailed explanation of the second and third steps will be thus omitted herefrom.

It is possible by the above production process to produce the negative electrode for the secondary battery according to the present embodiment with a simple procedure under precise control.

Negative Electrode

First Modification Example of Second Embodiment

A first modification example of the second embodiment is similar to the second embodiment in that a coating of insulating material is applied to surfaces of negative electrode active material particles 4 as shown in FIG. 3. Differently from the second embodiment in which the coating is of alumina, the coating is of ion-permeable resin (such as polyethylene oxide) in the present modification example. Even in such a configuration, the coating of the resin is arranged between negative electrode active material particles 4 so as to prevent developing conductivity by a percolation path throughout negative electrode active material layer 3. The effects, development mechanism and judgment procedure of this feature are the same as those explained above. Further, the preferable volume resistivity range of negative electrode active material layer 3 is also the same as that of the second embodiment.

It is feasible in the present modification example to adopt any configuration other than the above. For example, the insulating material can be any ion-permeable resin other than polyethylene oxide usable for gel electrolytes in batteries. Examples of such an ion-permeable resin are polypropylene oxide, polyacrylonitrile, polyvinylidene fluoride and polymethyl methacrylate. Any material other than the above ion-permeable resins can also be used. The polyethylene oxide or polypropylene oxide may have a functional group such as (meth)acrylic group introduced to an end thereof. Among others, polyethers such as polyethylene oxide and polypropylene oxide are preferred. These materials are easy to control the polymerization degree, molecular structure and functional group structure. It is possible by the control of such parameters to control the lithium-ion conductivity of negative electrode active material layer 3. Further, these materials can form a three-dimensional network structure by polymerization with the use of a polymerization initiator. There is no particular limitation on the polymerization initiator used for formation of the network structure. The polymerization initiator can be selected as appropriate in the light of common knowledge. For example, an organic peroxide such as peroxyketal compound is preferably used.

In the present modification example, the thickness of the coating of the insulating material (ion-permeable resin) is preferably in a range of 0.1 to 5 μm, more preferably 0.4 to 4 μm, still more preferably 1 to 3 μm. The coating can be used even when the thickness of the coating is out of this range. In this thickness range, it is possible to appropriately control the conductivity and insulating property of negative electrode active material layer 3 while minimizing an increase in the reaction resistance of negative electrode active material layer 3 and a decrease in the lithium-ion conductivity of negative electrode active material layer 3 caused by such a reaction resistance increase.

The content amount of the insulating material (ion-permeable resin) in negative electrode active material layer 3 is determined as appropriate, depending on the forms of the negative electrode active material and the insulating material (ion-permeable resin), in such a manner as not to develop the percolation path throughout the active material layer. For example, the content amount of the insulating material (ion-permeable resin) in negative electrode active material layer 3 is preferably 0.5 to 30 mass %, more preferably 1 to 5 mass %, relative to 100 mass % of the negative electrode active material particles.

In the present modification example, negative electrode active material layer 3 may contain any conventionally known additive or additives such as a binder as in the case of the second embodiment. The preferable thickness range of negative electrode active material layer 3 is also the same as that of the second embodiment. The coating of the insulating material (ion-permeable resin) preferably contains a lithium ion as lithium ions can be dissolved in the ion-permeable resin applied as the insulating material to the surfaces of negative electrode active material particles 4 in the present modification example. It is possible by adjusting the content amount of the lithium salt to control the lithium-ion conductivity of the coating (and by extension, the lithium-ion conductivity of negative electrode active material layer 3). The content amount of the lithium salt in the ion-permeable resin is determined depending on the desired lithium-ion conductivity of negative electrode active material layer 3.

Further, the density of negative electrode active material layer 3 is preferably in a range of 0.9 to 1.6 g/cm$^3$, more preferably 1.2 to 1.4 g/cm$^3$. In this density range, it is possible to maintain the thickness of the coating at a given level and prevent the developing conductivity by the percolation path throughout the negative electrode active material layer due to too much decrease in the thickness of the coating In the present modification example, the negative electrode for the secondary battery can be produced in the same manner as in the second embodiment. Namely, the coating of the insulating material (ion-permeable resin) is first applied to the surfaces of the negative electrode active material particles by mixing the negative electrode active material particles with the insulating material (ion-permeable resin) in the first step. The mixing is conducted in a solvent. An organic solvent such as dimethyl carbonate (DMC) can be used as the solvent. Preferred examples of the organic solvent are those capable of dissolving therein the ion-permeable resin. The polymerization initiator and the lithium salt may be added during the mixing of the negative electrode active material particles and the ion-permeable resin. It is alternatively feasible to conduct the mixing by separately preparing a solution in which the component materials other than the negative electrode active material particles are mixed, and then, adding the negative electrode active material particles to the prepared solution.

In the case of adding the polymerization initiator into the solution, the solution can be subjected to polymerization depending on the subject to which the polymerization initiator is sensitive. By this polymerization, the coating of the ion-permeable resin is formed with a three-dimensional network structure on the surfaces of the negative material active material particles.

There is no particular limitation on the content ratio of the respective component materials in the first step. The content ratio of the respective component materials is adjusted as appropriate in such a manner that the coating of the insulating material (ion-permeable resin) can be applied in the desired amount (thickness) onto the surfaces of the negative electrode active material particles. For example, the content amount of the ion-permeable resin as the insulating material is preferably 0.5 to 30 mass %, more preferably 1 to 5 mass %, relative to 100 mass % of the negative electrode active material particles. Further, the cross-linking degree of the ion-permeable resin in the coating can be controlled according to the content amount of the polymerization initiator. The content amount of the polymerization initiator is, for example, of the order of several thousands mass ppm relative to 100 mass % of the ion-permeable resin.

Using the complexes of the negative electrode active material particles and the insulating material obtained in the first step, a negative electrode active material slurry is prepared (second step). The prepared negative electrode active material slurry is then applied to the surface of the collector and dried, thereby forming the negative electrode active material layer on the surface of the collector (third step). In the present modification example, the second and third steps are the same as those in the first embodiment. The detailed explanation of the second and third steps will be thus omitted herefrom.

Negative Electrode

Second Modification Example of Second Embodiment

A second modification example of the second embodiment is similar to the second embodiment in that a coating of insulating material is applied to surfaces of negative electrode active material particles 4 as shown in FIG. 3. Differently from the second embodiment in which the coating is of alumina, the coating is of synthetic rubber adhesive (such as styrene-butadiene rubber latex) in the present modification example. Even in such a configuration, the coating of the synthetic rubber adhesive is arranged between negative electrode active material particles 4 so as to prevent developing conductivity by a percolation path throughout negative electrode active material layer 3. The effects, development mechanism and judgment procedure of this feature are the same as those explained above. Further, the preferable volume resistivity range of negative electrode active material layer 3 is also the same as that of the second embodiment.

It is feasible in the present modification example to adopt any configuration other than the above. For example, the insulating material can be any known synthetic rubber adhesive other than styrene-butadiene rubber latex. Among others, styrene-butadiene rubber latex is preferably used. In this case, it is possible to easily form the coating on the surfaces of the negative electrode active material particles and effectively exert the ultimate effects. In the present modification example, negative electrode active material layer 3 preferably contains a water-soluble polymer. When negative electrode active material layer 3 contains a water-soluble polymer, it is possible to advantageously prevent variations in the thickness of negative electrode active material layer 3 and easily control the internal capacity ratio (A/C balance) of the active material layer. Examples of such a water-soluble polymer are carboxymethyl cellulose (CMC), acrylamide, polyvinyl alcohol, methyl cellulose, guar gum, sodium alginate, carrageenan, xanthan gum and salts thereof. Among others, CMC or salt thereof is preferably used as the water-soluble polymer. In the case of using the CMC or salt thereof as the water-soluble polymer, the CMC (salt) is preferably of the type whose 1 mass % aqueous solution has a viscosity of 5 to 1000 mPa·s. In this case, the effects of the use of the water-soluble polymer, by which it is possible to prevent variations in the thickness of negative electrode active material layer 3 and easily control the capacity ratio of negative electrode active material layer 3, becomes more pronounced. The water-soluble polymer functions as a binder. The use of any other binder can be thus omitted by the addition of the water-soluble polymer into negative electrode active material layer 3.

In the present modification example, the thickness of the coating of the insulating material (synthetic rubber adhesive) is preferably in a range of 0.2 to 8 μm, more preferably 0.6 to 6 μm, still more preferably 1 to 4 μm. The coating can be used even when the thickness of the coating is out of this range. In this thickness range, it is possible to appropriately control the conductivity and insulating property of negative electrode active material layer 3.

The content amount of the insulating material (synthetic rubber adhesive) in negative electrode active material layer 3 is determined as appropriate, depending on the forms of the negative electrode active material and the insulating material (synthetic rubber adhesive), in such a manner as not to develop the percolation path throughout the active material layer. For example, the content amount of the insulating material (synthetic rubber adhesive) in negative electrode active material layer 3 is preferably 4 to 12 mass %, more preferably 7 to 12 mass %, relative to 100 mass % of the negative electrode active material particles. When the content amount of the insulating material is higher than or equal to the above lower limit, it is possible to sufficiently exert the effects of the present modification example. When the content amount of the insulating material is lower than or equal to the above upper limit, it is possible to secure the proper cycle retention of the battery. There is no particular limitation on the content amount of the water-soluble polymer in negative electrode active material layer 3. For example, the content amount of the water-soluble polymer is preferably 0.5 to 0.7 mass %, more preferably 0.8 to 1.3 mass %, relative to 100 mass % of the negative electrode active material particles. When the content amount of the water-soluble polymer is higher than or equal to the above lower limit, it is possible to appropriately control the viscosity of the negative electrode active material slurry for easy slurrying. When the content amount of the water-soluble polymer is lower than or equal to the above upper limit, there is no need to use a large amount of solvent for the addition of the water-soluble polymer so that it is possible to prevent variations in the application amount of the negative electrode active material slurry.

In the present modification example, negative electrode active material layer 3 may contain any conventionally known additive or additives such as a binder as in the case of the second embodiment. Further, the preferable thickness range of negative electrode active material layer 3 is the same as that of the second embodiment.

In the present modification example, the negative electrode for the secondary battery can be produced in the same manner as in the second embodiment. Namely, the coating of the insulating material (synthetic rubber adhesive) is first applied to the surfaces of the negative electrode active material particles by mixing the negative electrode active material particles with the insulating material (synthetic rubber adhesive) in the first step. The mixing is conducted in a solvent such as water. In the case of adding the water-soluble polymer, water is particularly preferred as the solvent. It is alternatively feasible to conduct the mixing by separately preparing an aqueous solution in which only the water-soluble polymer is dissolved, and then, adding the negative electrode active material particles and the synthetic rubber adhesive to the prepared aqueous solution.

There is no particular limitation on the content ratio of the respective component materials in the first step. The content ratio of the respective component materials is adjusted as appropriate in such a manner that the coating of the insulating material (synthetic rubber adhesive) can be applied in the desired amount (thickness) onto the surfaces of the negative electrode active material particles. For example, the content amount of the synthetic rubber adhesive as the insulating material is preferably 4 to 12 mass %, more preferably 7 to 12 mass %, relative to 100 mass % of the negative electrode active material particles. Further, the viscosity of the negative electrode active material slurry can be controlled according to the content amount of the water-soluble polymer. The content amount of the water-soluble polymer is preferably 0.5 to 1.7 mass %, more preferably 0.8 to 1.3 mass %, relative to 100 mass % of the ion-permeable resin.

Using the complexes of the negative electrode active material particles and the insulating material obtained in the first step, a negative electrode active material slurry is prepared (second step). The prepared negative electrode active material slurry is then applied to the surface of the collector and dried, thereby forming the negative electrode active material layer on the surface of the collector (third step). In the present modification example, the second and third steps are the same as those in the first embodiment. The detailed explanation of the second and third steps will be thus omitted herefrom.

[Battery]

The negative electrode for the secondary battery according to the above embodiment can be applied to a secondary battery. Namely, there is provided according to one exemplary embodiment of the present invention a secondary battery with a power generating element in which an electric cell unit includes: a positive electrode having a collector and a positive electrode active material layer formed on a surface of the collector; a negative electrode having a collector and a negative electrode active material layer formed on a surface of the collector; and an electrolyte layer laminated between the positive electrode and the negative electrode in such a manner that the active material layer of the positive electrode and the active material layer of the negative electrode face each other via the electrolyte layer. The secondary battery according to this exemplary embodiment is characterized in that the negative electrode is the negative electrode for the secondary battery according to the above embodiment. For example, the secondary battery can be in the form of a lithium-ion secondary battery. It is feasible to apply the negative electrode for the secondary battery according to the above embodiment to not only a lithium-ion secondary battery but also any other type of secondary battery. There is no particular limitation on the structure and form of the secondary battery. The secondary battery can be of the bipolar type or the laminate type. Hereinafter, the structure of a bipolar lithium-ion secondary battery as one example of the secondary battery will be explained below.

Figure 4:
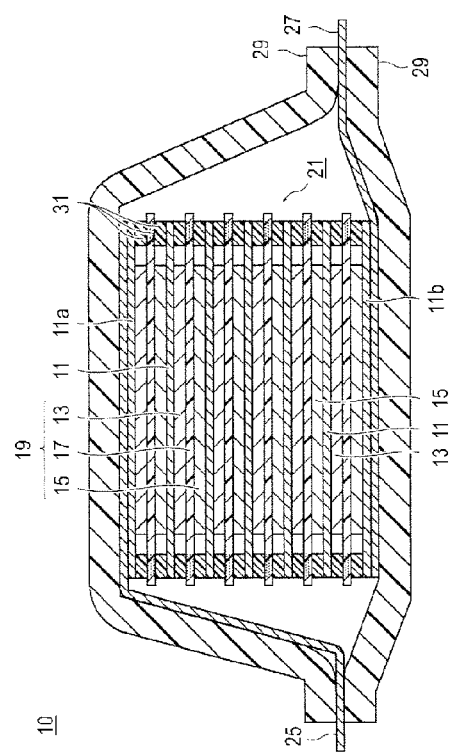
FIG. 4 is a schematic section view of a bipolar lithium-ion secondary battery according to one exemplary embodiment of the present invention.

FIG. 4 is a schematic section view of the bipolar lithium-ion secondary battery (hereinafter also simply referred to as "bipolar secondary battery") according to one exemplary embodiment of the present invention.

In the present embodiment shown in FIG. 4, bipolar secondary battery 10 has substantially rectangular power generating element 21, which actually undergoes a charge/discharge reaction, sealed in laminate sheet battery package 29.

Power generating element 21 includes a plurality of bipolar electrodes. Each of the bipolar electrodes has collector 11, positive electrode active material layer 13 electrically connected to one side of collector 11 and negative electrode active material layer 15 electrically connected to the other side of collector 11. The bipolar electrodes are laminated together via electrolyte layers 17 to thereby constitute power generating element 21. Electrolyte layer 17 has a separator as a substrate medium and an electrolyte material retained in a planar center portion of the separator. The bipolar electrodes and electrolyte layers 17 are alternately laminated on each other in such a manner that positive electrode active material layer 13 of either one of the bipolar electrodes faces negative electrode active material layer 15 of any other one of the bipolar electrodes adjacent to the aforementioned either one of the bipolar electrodes via electrolyte layer 17. In other words, electrolyte layer 17 is arranged between positive electrode active material layer 13 of the either one of the bipolar electrodes and negative electrode active material layer 15 of the any other one of the bipolar electrodes adjacent to the aforementioned either one of the bipolar electrodes.

These adjacently located positive electrode active material layer 13, electrolyte layer 17 and negative electrode active material layer 15 constitute electric cell unit 19. It can be thus said that bipolar battery 10 has a laminated structure of a plurality of electric cell units 19. In order to prevent the occurrence of a liquid junction due to the leakage of an electrolytic solution from electrolyte layer 17, seal portion 31 is arranged on an outer periphery of electric cell unit 19. The arrangement of such seal portion 31 is also effective in providing insulation between adjacent collectors 11 and preventing short circuit caused by contact between the adjacent electrodes. Outermost collector 11a is located as a positive-electrode-side outermost layer of power generating element 21. Positive electrode active material layer 13 is formed only on one side of outermost collector 11a. Further, outermost collector 11b is located as a negative-electrode-side outermost layer of power generating element 21. Negative electrode active material layer 15 is formed only on one side of outermost collector 11b. Alternatively, positive electrode active material layers 13 may be formed on both sides of positive-electrode-side outermost collector 11a; and negative electrode active material layer 15 may be formed on both sides of negative-electrode-side outermost collector 11b.

Bipolar battery 10 also has positive electrode collector plate 25 located adjacent to positive-electrode-side outermost collector 11a and led out from laminate sheet battery package 29 and negative electrode collector plate 27 located adjacent to negative-electrode-side outermost collector 11b and led out from laminate sheet battery package 29 as shown in FIG. 4.

The structural parts of the bipolar secondary battery, other than the negative electrode, will be briefly explained below. The bipolar secondary battery is not however limited to the following configuration.

[Positive Electrode (Positive Electrode Active Material Layer)]

Positive electrode active material layer 13 contains a positive electrode active material and may optionally contain any other additive or additives as needed. The component materials other than the positive electrode active material of positive electrode active material layer 13 can be the same as those of negative electrode active material layer 15 as mentioned above. The detailed explanation of the component materials other than the positive electrode active material of positive electrode active material layer 13 will be thus omitted herefrom. There is no particular limitation on the content ratio of the component materials of positive electrode active material layer 13 and the thickness of positive electrode active material layer 13. The component material mixing ratio and thickness of positive electrode active material layer 13 are adjusted as appropriate in the light of common knowledge about lithium-ion secondary batteries.

There is no particular limitation on the positive electrode active material as long as the positive electrode active material is a substance capable of absorbing and desorbing lithium. Any positive electrode active materials commonly used for lithium-ion secondary batteries are applicable. Preferred are lithium-transition metal composite oxides. Examples of the lithium-transition metal composite oxide are: Li—Mn composite oxide such as $LiMn_2O_4$; Li—Ni composite oxide such as $LiNiO_2$; and Li—Ni—Mn composite oxide such as $LiNi_{0.5}Mn_{0.5}O_2$. In some cases, two or more kinds of positive electrode active materials may be used in combination.

[Electrolyte Layer]

Electrolyte layer 17 functions as a spatial bulkhead (spacer) between the positive and negative electrode active material layers and also has the function of containing and retaining therein an electrolyte as a lithium-ion carrier between the positive and negative electrodes during charging/discharging of the battery.

There is no particular limitation on the electrolyte. Liquid electrolytes and polymer electrolytes such as polymer gel electrolytes and polymer solid electrolytes can suitably be used.

The liquid electrolyte is in the form where a lithium salt is dissolved in an organic solvent. Examples of the organic solvent are carbonates such as ethylene carbonate (EC) and propylene carbonate (PC). Examples of the lithium salt are the same as those added in the electrode active material layers, such as $LiN(SO_2C_2F_5)_2$, $LiN(SO_2CF_3)_2$, $LiPF_6$, $LiBF_4$, $LiClO_4$, $LiAsF_6$ and $LiSO_3CF_3$.

The polymer electrolytes are classified into a polymer gel electrolyte in which an electrolytic solution is contained and a polymer solid electrolyte in which an electrolytic solution is not contained.

The polymer gel electrolyte is in the form where the above-mentioned liquid electrolyte is impregnated into a lithium-ion-conductive matrix polymer. Examples of the lithium-ion-conductive matrix polymer are polyethylene oxide (PEO), polypropylene oxide (PPO) and copolymers thereof. In these matrix polymers, the electrolytic salt such as lithium salt can be dissolved well.

The separator may be used in the electrolyte layer in the case where the electrolyte layer is formed from the liquid electrolyte or gel electrolyte. Specific examples of the separator are porous films of hydrocarbons such as polyolefins e.g. polyethylene, polypropylene etc. and polyvinylidene fluoride-hexafluoropropylene (PVdF-HFP) and glass fibers.

The polymer solid electrolyte is in the form where the support salt (lithium salt) is dissolved in the above-mentioned matrix polymer and does not contain an organic solvent as a plasticizer. It is thus possible to obtain improvement in battery reliability with no fear of liquid leakage in the case where the electrolyte layer is formed from the polymer solid electrolyte.

The matrix polymer of the polymer gel electrolyte or polymer solid electrolyte can provide good mechanical strength by the formation of a cross-linking structure. In order to form the cross-linking structure, it is feasible to subject a polymerizable material (such as PEO or PPO) for formation of the polymer electrolyte to any polymerization reaction such as thermal polymerization, ultraviolet polymerization, radiation induced polymerization or electron-beam induced polymerization with the use of any appropriate polymerization initiator. As mentioned above, the electrolyte may be contained in the electrode active material layer.

[Seal Portion]

Seal portion 31 is a structural part specific to the bipolar secondary battery and is arranged on the outer periphery of electric cell unit 19 in order to prevent leakage from electrolyte layer 17. Seal portion 31 also has the function of preventing, in the battery, contact between the adjacent collectors and short circuit caused due to slight variations between ends of the laminated electrodes. In bipolar battery of FIG. 4, seal portion 31 is arranged on the outer peripheries of electric cell units 19 in such a manner that seal portion 31 is held between collectors 11 of two adjacent electric cell units 19 and passes through an outer edge portion of the separator, that is, the substrate medium of electrolyte layer 17. As the material of seal portion 31, there can be used polyolefin resins such as polyethylene and polypropylene, epoxy resins, rubbers and polyimide resins. Among others, polyolefin resins are preferred in terms of corrosion resistance, chemical resistance, film formation property and cost efficiency.

[Positive and Negative Collector Plates]

There is no particular limitation on the material of collector plate (25, 27). Any known high conductive materials commonly used for collectors of lithium-ion secondary batteries are applicable. Preferred examples of the material of the collector plate are metal materials such as aluminum, copper, titanium, nickel, stainless steel (SUS) and alloys thereof. Among others, aluminum and copper are more preferred in terms of light weight, corrosion resistance and high conductivity. Particularly preferred is aluminum. Positive electrode collector plate 25 and negative electrode collector plate 27 can be of the same material or of different materials. Alternatively, outermost collector 11a, 11b may be extended in such a manner that an end portion of outermost collector 11a, 11b functions as the collector plate as shown in FIG. 4. Further, a tab may be provided separately and connected to the outermost collector.

[Positive and Negative Leads]

Although omitted from the drawings, collectors 11 may be electrically connected to collector plates (25, 27) via positive and negative leads. As the material of the positive and negative leads, any known lead materials commonly used for lithium-ion secondary batteries are applicable. It is desirable to cover any parts of the leads led out of the battery package with heat-resistant, heat-shrinkable insulating tubes etc. so as not to cause ground fault upon contact with peripheral equipment or wiring and thereby not to affect the performance of the product (automotive part, notably electronic equipment).

[Battery Package]

As shown in FIG. 4, the batter package can be of laminate sheet 29. In the present embodiment, laminate sheet 29 have a three-layer structure in which a polypropylene layer, an aluminum layer and a nylon layer are laminated together in this order. In some cases, a conventionally known metal can may alternatively be used as the battery package.

Bipolar secondary battery 10 according to the present embodiment can effectively prevent the occurrence of internal short circuit, the continuous flow of a short-circuit current and battery performance deterioration resulting therefrom during operation as the negative electrode for the secondary battery according to the above embodiment is used in the bipolar secondary battery. It is thus possible according to the present embodiment to provide the battery with high reliability.

Although the present invention has been described with reference to the above-specific embodiments, the present invention is not limited to these exemplary embodiments. Various modification and variation of the embodiments described above will occur to those skilled in the art in light of the above teachings.

EXAMPLES

The effects of the negative electrode according to the above embodiment of the present invention and the battery using this negative electrode will be described below by way of the following examples and comparative examples. It is noted that the following examples are only illustrative and not intended to limit the technical scope of the present invention thereto.

Comparative Example 1

A negative electrode material slurry was prepared by mixing spherical graphite (median size: 25 μm) as a negative electrode active material and polyvinylidene fluoride (PVdF) as a binder at a mass ratio of 94:6, admixing the resulting mixture with N-methyl-2-pyrrolidone (NMP) as a slurry viscosity adjusting solvent such that the total solid content was nearly 50 mass %, and then, kneading the mixture sufficiently.

On the other hand, a copper foil sheet was provided as a negative electrode collector. The above-prepared negative electrode material slurry was applied to one side of the copper foil sheet by a bar coater at a density of 10 mg/cm$^2$ and dried by a hot plate at 50° C. for 5 minutes and at 100° C. for 10 minutes, thereby forming a negative electrode active material layer on the collector. The laminate of the negative electrode active material layer and the collector was subjected to die-cutting into a size of 14 mm diameter. With this, a negative electrode for a coin battery was obtained.

Using a polyethylene terephthalate (PET) film in place of the copper foil sheet, a negative electrode active material layer was formed in the same as above on one side of the PET film. The volume resistivity of this negative electrode active material layer was measured by four-probe method and determined to be 0.3 Ω·cm. It is herein noted that, in each of the following examples, the volume resistivity was measured in the same manner as above and indicated in TABLE 1.

A coin battery was produced by using the above-obtained negative electrode in combination with a foil sheet of lithium metal (diameter: 14 mm) as a counter electrode and a glass wool as a separator and filling the laminate of these structural parts with an electrolytic solution. The electrolytic solution herein used was 2EC3DEC dissolving therein 1 mol/L of lithium salt (LiPF$_6$).

Example 1-1

A coin battery was produced in the same manner as in Comparative Example 1, except that the negative electrode active material was obtained by the following procedure.

First, 100 parts by mass of alumina particles of 0.3 μm average particle size as an insulating material was mixed with 3.3 parts by mass of carboxymethyl cellulose (CMC) (available under the trade name of PL-15 from Dai-ichi Kogyo Seiyaku Co., Ltd.) as a water-soluble polymer. Ion-exchanged water was added to the resulting mixture, thereby obtaining an aqueous solution with a viscosity of 8.5 mPa·s. Herein, the viscosity of the CMC polymer indicated in TABLE is a viscosity of an aqueous solution containing 1 mass % of the CMC used as measured at 25° C. by a B-type viscometer.

As a raw material of the negative electrode active material, graphite active material MCMB (average particle size: 20 μm) was provided. The above-prepared aqueous solution was sprayed onto the MCMB particles with the use of a rolling flow coating machine (Multiplex Processor manufactured by Powrex Corporation). The negative electrode active material was thus obtained in which the alumina particles were spot-applied to the surfaces of the MCMB particles. The amount of the alumina particles spot-applied to the MCMB particle surfaces was 10 parts by mass relative to 90 parts by mass of the MCMB particles.

Example 1-2

A coin battery was produced in the same manner as in Example 1-1, except that the alumina particles spot-applied to the surfaces of the negative electrode active material particles were those having an average particle size of 0.8 μm.

Example 1-3

A coin battery was produced in the same manner as in Example 1-1, except that the alumina particles spot-applied to the surfaces of the negative electrode active material particles were those having an average particle size of 4 μm.

Example 1-4

A coin battery was produced in the same manner as in Example 1-1, except that the alumina particles spot-applied to the surfaces of the negative electrode active material particles were those having an average particle size of 0.06 μm.

Example 1-5

A coin battery was produced in the same manner as in Example 1-1, except that the alumina particles spot-applied to the surfaces of the negative electrode active material particles were those having an average particle size of 7 μm.

[Battery Evaluation]

Figure 5:
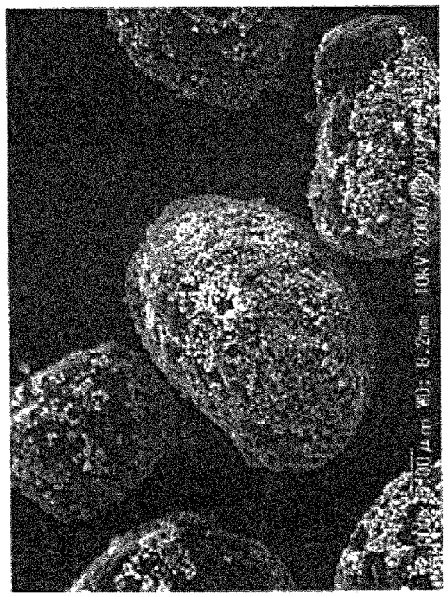
FIG. 5 is a scanning electron microscope (SEM) image of a negative electrode active material of Example 1-2.

The following evaluation tests were performed on the coin batteries of Comparative Example 1 and Examples 1-1 to 1-5. The test results of these examples are indicated in TABLE 1. Further, a scanning electron microscope (SEM) image of the negative electrode active material of Example 1-2 is shown in FIG. 5.

In order to examine the discharge performance of the coin battery under high-rate conditions, the coin battery was evaluated for the percentage ratio of the discharge capacity at a discharge current of 0.2 C and at a discharge current of 0.05 C (discharge capacity at 0.2 C/discharge capacity at 0.05 C×100). The test results on the capacity percentage ratio are shown in TABLE 1. This evaluation test was conducted in a thermostat of 35° C.

In order to examine the influence of the long-term storage of the coin battery on the battery performance, the coin battery was charged to 4.2 V, left still in a thermostat of 35° C. for one month and then measured for the amount of drop in battery voltage. The battery voltage drop amount is one measure of occurrence of an internal short circuit in the battery. The larger the battery voltage drop amount, the more occurrence of internal short circuit in the battery. The test results on the battery voltage drop amount are indicated in TABLE 1, each as a relative value assuming the battery voltage drop amount of Comparative Example 1 as 100%.

The coil battery was also measured for the discharge capacity at a discharge current of 0.2 C in a thermostat of 35° C. and evaluated for the capacity retention after aging. The test results on the capacity after aging are indicated in TABLE 1, each as a relative value assuming the capacity of Comparative Example 1 as 100%.

Further, the coin battery was subjected to 100 cycles of 1 C charge-discharge cycle test in order to examine the cycle durability of the coin battery. This test was conducted in a thermostat of 35° C.

TABLE 1

| | Insulating material (alumina particles) | | | CMC | |
|---|---|---|---|---|---|
| | Kind | Median particle size (μm) | Content (parts by mass) | Kind | Viscosity (mPa · s) |
| Comparative Example 1 | — | — | — | — | — |
| Example 1-1 | Al$_2$O$_3$ | 0.3 | 10 | PL-15 | 10-20 |
| Example 1-2 | Al$_2$O$_3$ | 0.8 | 10 | PL-15 | 10-20 |
| Example 1-3 | Al$_2$O$_3$ | 4 | 10 | PL-15 | 10-20 |
| Example 1-4 | Al$_2$O$_3$ | 0.06 | 10 | PL-15 | 10-20 |
| Example 1-5 | Al$_2$O$_3$ | 7 | 10 | PL-15 | 10-20 |

TABLE 1-continued

| | Negative electrode volume resistivity (Ω · cm) | Storage test voltage drop amount (%) | 0.2 C/0.05 C capacity retention (%) | Capacity after aging (%) |
|---|---|---|---|---|
| Comparative Example 1 | 0.3 | 100 | 99 | 100 |
| Example 1-1 | 15 | 24 | 65 | 100 |
| Example 1-2 | 9.5 | 27 | 70 | 100 |
| Example 1-3 | 2.1 | 35 | 72 | 100 |
| Example 1-4 | 122 | 20 | 31 | 77 |
| Example 1-5 | 0.8 | 51 | 71 | 100 |

As is seen from TABLE 1, the batteries of Examples 1-1 to 1-5 showed a significantly small voltage drop after the storage test as compared to that of Comparative Example 1. Further, the negative electrode active material layers of Examples 1-1 to 1-5 had higher volume resistivity than that of Comparative Example 1. It is assumed from the above results that, in each of these examples, the spot application of the alumina particles made it possible to prevent developing conductivity by a percolation path throughout the negative electrode active material layer so that a short-circuit current did not flow continuously even in the occurrence of an internal short circuit.

It is seen from comparison of Examples 1-1 to 1-3 and Example 1-4 that the battery was effectively protected from an internal short circuit but showed a deterioration in capacity after aging when the particle size of the alumina particles as the insulating material was small. The reason for such a capacity deterioration is assumed to be that, as is also verified by a significant increase in the volume resistivity of the battery, the conduction paths between the negative electrode active material particles were significantly reduced as a result of almost complete coverage of the surfaces of the active material particles by the small-size alumina particles.

Furthermore, the voltage drop amount of the battery was larger in Example 1-5 than in the other examples even though the battery was protected from an internal short circuit more effectively in Example 1-5 than in Comparative Example 1. The reason for this large voltage drop amount is assumed to be that the alumina particles as the insulating material were large in particle size and thus were not sufficiently spot-applied to the surfaces of the negative electrode active material particles so that there was developed conductivity by a percolation path in some part of the negative electrode active material layer.

Example 1-6

A coin battery was produced in the same manner as in Example 1-2, except that the spray amount of the aqueous solution of the alumina particles and CMC was adjusted such that the amount of the alumina particles spot-applied to the MCMB particle surfaces was 3 parts by mass relative to 90 parts by mass of the MCMB particles.

Example 1-7

A coin battery was produced in the same manner as in Example 1-2, except that the spray amount of the aqueous solution of the alumina particles and CMC was adjusted such that the amount of the alumina particles spot-applied to the MCMB particle surfaces was 25 parts by mass relative to 90 parts by mass of the MCMB particles.

Example 1-8

A coin battery was produced in the same manner as in Example 1-2, except that the spray amount of the aqueous solution of the alumina particles and CMC was adjusted such that the amount of the alumina particles spot-applied to the MCMB particle surfaces was 1 parts by mass relative to 90 parts by mass of the MCMB particles.

Examples 1-9

A coin battery was produced in the same manner as in Example 1-2, except that the spray amount of the aqueous solution of the alumina particles and CMC was adjusted such that the amount of the alumina particles spot-applied to the MCMB particle surfaces was 35 parts by mass relative to 90 parts by mass of the MCMB particles.

[Battery Evaluation]

The same evaluation tests as above were performed on the coin batteries of Examples 1-6 to 1-9. The test results of Examples 1-6 to 1-9 are indicated, together with the test results of Comparative Example 1 and Example 1-2, in TABLE 2

TABLE 2

| | Insulating material (alumina particles) | | | CMC | |
|---|---|---|---|---|---|
| | Kind | Median particle size (μm) | Content (parts by mass) | Kind | Viscosity (mPa · s) |
| Comparative Example 1 | — | — | — | — | — |
| Example 1-6 | $Al_2O_3$ | 0.8 | 3 | PL-15 | 10-20 |
| Example 1-2 | $Al_2O_3$ | 0.8 | 10 | PL-15 | 10-20 |
| Example 1-7 | $Al_2O_3$ | 0.8 | 25 | PL-15 | 10-20 |
| Example 1-8 | $Al_2O_3$ | 0.8 | 1 | PL-15 | 10-20 |
| Example 1-9 | $Al_2O_3$ | 0.8 | 35 | PL-15 | 10-20 |

| | Negative electrode volume resistivity (Ω · cm) | Storage test voltage drop amount (%) | 0.2 C/0.05 C capacity retention (%) | Capacity after aging (%) |
|---|---|---|---|---|
| Comparative Example 1 | 0.3 | 100 | 99 | 100 |
| Example 1-1 | 2.4 | 34 | 71 | 98 |
| Example 1-2 | 9.5 | 27 | 70 | 100 |
| Example 1-3 | 18 | 21 | 67 | 100 |
| Example 1-4 | 0.9 | 48 | 72 | 82 |
| Example 1-5 | 32 | 20 | 54 | 100 |

As is seen from TABLE 2, the batteries of Examples 1-6 to 1-9 showed a significantly small voltage drop after the storage test as compared to that of Comparative Example 1. Further, the negative electrode active material layers of Examples 1-6 to 1-9 had higher volume resistivity than that of Comparative Example 1. It is assumed from the above results that, in each of these examples, the spot application of the alumina particles made it possible to prevent developing conductivity by a percolation path throughout the negative electrode active material layer so that a short-circuit current did not flow continuously even in the occurrence of an internal short circuit.

It is seen from comparison of Examples 1-2 and 1-6 and Examples 1-7 and 1-8 that the battery was more effectively protected from an internal short circuit than in Comparative Example 1 but showed some deteriorations in voltage drop amount and capacity after aging when the spot application amount of the alumina particles as the insulating material was small. The reason for these deteriorations is assumed to be that the surfaces of the active material particles were not sufficiently covered by the alumina particles so that there was developed conductivity by a percolation path in some part of the negative electrode active material layer.

It is also seen from comparison of Examples 1-2 and 1-6 and Examples 1-7 and 1-9 that the large spot application amount of the alumina particles as the insulating material was preferred in terms of prevention of internal short circuit (voltage drop amount) but led to some deterioration in capacity retention (rate characteristics). The reason for such a capacity deterioration is assumed to be that the negative electrode active material was completely covered by the alumina particles so that the percolation paths between the active material particles were too less for the operations of the battery. It is suggested from this data that the spot application amount of the alumina particles has a preferable range.

Example 1-10

A negative electrode active material was obtained in the same manner as in Example 1-2, except for using WS-C (available from Dai-ichi Kogyo Seiyaku Co., Ltd.) in place of PL-15 as the CMC.

Example 1-10

A negative electrode active material was obtained in the same manner as in Example 1-2, except for using BS-H (available from Dai-ichi Kogyo Seiyaku Co., Ltd.) in place of PL-15 as the CMC.

[Battery Evaluation]

The negative electrode active materials of Examples 1-10 and 1-11 were tested for the occurrence or non-occurrence of aggregation of the raw negative electrode active material (MCMB) and the alumina particles. The test results of Examples 1-10 and 1-11 are indicated together with the test results of Example 1-2 in TABLE 3.

TABLE 3

| | Insulating material (alumina particles) | | | CMC | | |
|---|---|---|---|---|---|---|
| | Kind | Median particle size (μm) | Content (parts by mass) | Kind | Viscosity (mPa · s) | Occurrence of aggregation |
| Example 1-2 | Al$_2$O$_3$ | 0.8 | 10 | PL-15 | 10-20 | none |
| Example 1-10 | Al$_2$O$_3$ | 0.8 | 10 | WS-C | 150-250 | none |
| Example 1-11 | Al$_2$O$_3$ | 0.8 | 10 | BS-H | 500-800 | none |

As is seen from TABLE 3, the particle preparation process was performed efficiently, without causing aggregation of the raw negative electrode active material (CMC) and the alumina particles, even with the use of the CMC polymers of different viscosity.

Example 1-12

A negative electrode active material was obtained by simply mixing 100 mass % of the same spherical graphite (median size: 25 μm) as that used in Comparative Example 1 with 1.0 mass % of alumina particles (median size: 50 nm) such that the alumina particles were spot-applied to the surfaces of the spherical graphite particles.

A coin battery was produced in the same manner as in Comparative Example 1, except for using the above-obtained negative electrode active material in place of the spherical graphite.

Example 1-13

A coin battery was produced in the same manner as in Example 1-12, except that the mixing amount of the alumina particles was 3 mass % relative to 100 mass % of the spherical graphite.

[Battery Evaluation]

The coin batteries of Examples 1-12 and 1-13 were tested for the negative electrode volume resistivity, 0.2 C/0.5 C capacity retention, voltage drop amount during storage test and capacity after aging in the same manner as above. The test results of Examples 1-12 and 1-13 are indicated together with the test results of Comparative Example 1 in TABLE 4.

TABLE 4

| | Content (wt %) | | Negative electrode volume |
|---|---|---|---|
| | Carbon | PVdf | resistivity (Ω · cm) |
| Comparative Example 1 | 94 | 6 | 0.3 |
| Example 1-12 | 93.92 | 6 | 0.32 |
| Example 1-13 | 91.18 | 6 | 0.32 |

| | Coin battery | | |
|---|---|---|---|
| | 0.2 C/0.05 C capacity retention (%) | Storage test voltage drop amount (%) | Capacity after aging (%) |
| Comparative Example 1 | 99 | 100.0 | 100.0 |
| Example 1-12 | 99 | 80.0 | 99.0 |
| Example 1-13 | 99 | 80.5 | 97.0 |

As is seen from TABLE 4, the voltage drop amount of the battery during the storage test was limited even when the alumina particles was spot-applied to the surfaces of the negative electrode active material particles by simply mixing the alumina particles with the negative electrode active material particles as compared to the case of not performing such spot application by simple mixing (Comparative Example 1). It can be thus said that the spot application by simple mixing is also effective in preventing the occurrence of an internal short circuit.

Comparative Example 2

A resin collector (thickness: 20 μm) was provided in which carbon fine particles (70 vol %, average particle size: 0.8 μm) as conductive particles were dispersed in polypropylene (30 vol %) as a polymer material.

A positive electrode active material slurry was prepared by mixing LiMn$_2$O$_4$ (93 mass %) as a positive electrode active material with Acetylene Black (2 mass %) as a conductive agent, PVdF (5 mass %) as a binder and NMP (appropriate amount) as a slurry viscosity adjusting solvent.

A positive electrode active material layer was formed on one side of the above-provided collector by applying and drying the prepared positive electrode active material slurry.

A negative electrode active material layer was formed on the other side of the above-provided collector in the same manner as in Comparative Example 1. The resulting laminate was cut into a size of 140 mm×90 mm and then provided with a peripheral portion of 10 mm width to which the positive and negative electrode active material layers were not applied. By the above procedure, bipolar electrodes were obtained each having a center portion of 120 mm×70 mm size to which the positive and negative electrode active material layers were applied.

A power generating element was produced by alternately laminating the above-obtained bipolar electrodes (five bipolar electrodes) and polypropylene-containing separators (thickness: 30 μm) in such a manner that the positive and negative electrode active material layers of the adjacent bipolar electrodes faced each other via the separator. The electrolytic solution herein used was 2EC3DEC (1M LiPF$_6$).

Subsequently, two aluminum terminal plates of 130 mm×80 mm size (thickness: 100 μm) were laminated over the entire projection areas of the outermost active material layers of the power generating element, respectively. The power generating element was vacuum-sealed in an aluminum laminate film package with parts of the terminal plates being led out to the outside of the aluminum laminate film package, and then, pressed under atmospheric pressure to increase the contact between the power generating element and the terminal plates. With this, a bipolar battery was completed.

Example 2

A bipolar battery was produced in the same manner as in Comparative Example 2, except for using the negative electrode active material slurry prepared in Example 1-2 for formation of the negative electrode active material layer.

[Battery Evaluation]

Each of the bipolar batteries of Comparative Example 2 and Example 2 was charged to 12.5 V at a constant current (CC) of 0.5 mA and then at a constant voltage (CV) (total 10 hours), left in left still in a thermostat of 35° C. for one month and measured for the amount of drop in battery voltage. The test results of Comparative Example 2 and Example 2 are indicated together with the test results of Comparative Example 2 in TABLE 5. Further, the volume resistivity of the electrode was measured as follows. The electrode layer was applied on a PET sheet. The resulting laminate was cut into a sheet of 80 mm×50 mm size. The electrical resistance of the cut laminate sheet was measured with the use of Loresta EP MCP-T-360 (manufactured by Mitsubishi Chemical Analytech Co., Ltd.) upon contact of a probe-type ASP terminal with an intersection of diagonal lines of the laminate sheet. The volume resistivity (Ω·cm) was determined by converting the measurement resistance value to a surface resistivity (Ω/sq) by multiplication by a correction coefficient of RCF=4.2353 and multiplying the surface resistivity by the thickness t (cm) of the electrode layer of the laminated sheet. The volume resistivity of the collector was measured in the same manner as above.

TABLE 5

| | Insulating material (alumina particles) | | | CMC | |
|---|---|---|---|---|---|
| | Kind | Median particle size (μm) | Content (parts by mass) | Kind | Viscosity (mPa · s) |
| Comparative Example 2 | — | — | — | — | — |
| Example 2 | Al$_2$O$_3$ | 0.8 | 10 | PL-15 | 10-20 |

| | Negative electrode volume resistivity (Ω · cm) | Positive electrode volume resistivity (Ω · cm) | Collector volume resistivity (Ω · cm) | Voltage after storage test |
|---|---|---|---|---|
| Comparative Example 2 | 0.3 | 3.5 | 3.2 | 12.40 V |
| Example 2 | 9.5 | 3.5 | 3.2 | 12.45 V |

As is seen from TABLE 5, the bipolar battery of Example 2 showed a small voltage drop after the storage test and was protected from an internal short circuit between the electrode active material layers. On the other hand, the bipolar battery of Comparative Example 2 showed a large voltage drop after the storage test and was not sufficiently protected from an internal short circuit. It is assumed from these results that, in Example 2, the spot application of the alumina particles made it possible to prevent developing conductivity by a percolation path throughout the negative electrode active material layer so that a short-circuit current did not flow continuously even in the occurrence of an internal short circuit. This assumption is also verified by the test result that the volume resistivity of the negative electrode of Example 2 was 30 times or higher than that of Comparative Example 2.

Examples 3-1 to 3-5

Figure 6:
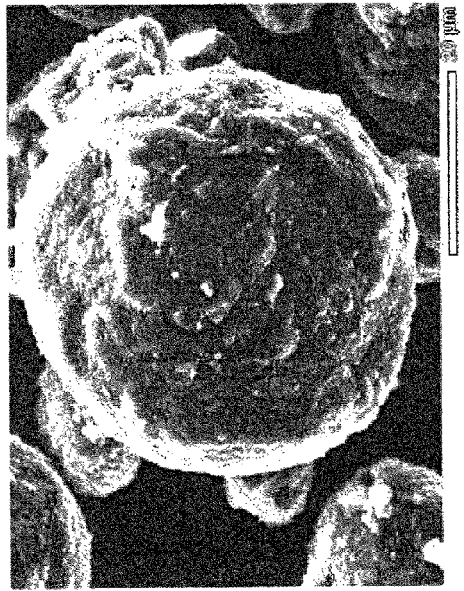
FIG. 6 is a scanning electron microscope (SEM) image of a negative electrode active material of Example 3-2.
Figure 7:
FIG. 7 is a diagram showing the results of quantification analysis of aluminum in the negative electrode active material of Example 3-2 by inductively coupled plasma emission spectrometry.

A negative electrode active material was obtained by providing alumina as an insulating material and the same spherical graphite particles (median size: 25 μm) as those used in Comparative Example 1 as a negative electrode active material and applying an insulating plating (coating) of the alumina to surfaces of the spherical graphite particles as disclosed in International Patent Application Publication No. WO 2007/094253. At this time, the thickness of the alumina coating was controlled by adjusting the amount of the alumina applied to the spherical graphite. The thickness of the coating and the aluminum and alumina contents (mass %) of the negative electrode active material in the respective examples are indicated in TABLE 5. Herein, the aluminum and alumina contents of the negative electrode active material were determined by quantification analysis of aluminum with the use of an inductively coupled plasma emission spectrometer (SPR-1700HVR). Further, a scanning electron microscope (SEM) image of the negative electrode active material of Example 3-2 is shown in FIG. 6. The aluminum quantification results of the negative electrode active material of Example 3-2 by inductively coupled plasma emission spectroscopy are shown in FIG. 7.

TABLE 6

|  | Coating thickness (nm) | Al content (wt %) | $Al_2O_3$ content (wt %) |
|---|---|---|---|
| Example 3-1 | 1 | 0.05 | 0.094 |
| Example 3-2 | 10 | 0.5 | 0.944 |
| Example 3-3 | 50 | 1.6 | 3.02 |
| Example 3-4 | 100 | 3.0 | 5.67 |
| Example 3-5 | 500 | 15 | 28.3 |

Then, coin batteries were produced in Examples 3-1 to 3-5 in the same manner as in Comparative Example 1, except for using the above-obtained negative electrode active materials, respectively, in place of the spherical graphite.

[Battery Evaluation]

The coin batteries of Examples 3-1 to 3-5 were tested for the negative electrode volume resistivity, 0.2 C/0.5 C capacity retention, voltage drop amount during storage test and capacity after aging in the same manner as above. The test results of Examples 3-1 to 3-5 are indicated together with the test results of Comparative Example 1 in TABLE 7.

TABLE 7

|  | Coating thickness (nm) | Content (wt %) | | Negative electrode volume resistivity ($\Omega \cdot cm$) |
|---|---|---|---|---|
|  |  | Carbon | PVdf |  |
| Comparative Example 1 | — | 94.00 | 6 | 0.30 |
| Example 3-1 | 1 | 93.92 | 6 | 0.32 |
| Example 3-2 | 10 | 93.25 | 6 | 0.40 |
| Example 3-3 | 50 | 91.18 | 6 | 0.65 |
| Example 3-4 | 100 | 89.30 | 6 | 1.76 |
| Example 3-5 | 500 | 79.90 | 6 | 7.29 |

| Coin battery | | | |
|---|---|---|---|
|  | 0.2 C/0.05 C capacity retention (%) | Storage test voltage drop amount (%) | Capacity after aging (%) |
| Comparative Example 1 | 99 | 100.0 | 100.0 |
| Example 3-1 | 99 | 40.3 | 99.9 |
| Example 3-2 | 99 | 30.0 | 99.2 |
| Example 3-3 | 99 | 29.5 | 97.0 |
| Example 3-4 | 99 | 28.0 | 95.0 |
| Example 3-5 | 99 | 28.8 | 85.0 |

As is seen from TABLE 7, the coin batteries of Examples 3-1 to 3-5 showed a significantly small voltage drop after the storage test as compared to that of Comparative Example 1 in which the alumina coating was not applied to the negative electrode active material. In particular, the voltage drop of the battery after the storage test was remarkably small when the alumina coating thickness was 10 to 500 nm (Examples 3-2 to 3-5).

Example 4

A bipolar battery was produced in the same manner as in Comparative Example 2, except for using the negative electrode active material slurry prepared in Example 3-3 for formation of the negative electrode active material layer.

[Battery Evaluation]

The bipolar battery of Example 4 was charged to 12.5 V at a constant current (CC) of 0.5 mA and then at a constant voltage (CV) (total 10 hours), left in left still in a thermostat of 35° C. for one month and measured for the amount of drop in battery voltage. The test results of Example 4 are indicated together with the test results of Comparative Example 2 in TABLE 8.

TABLE 8

|  | Content (wt %) | | Negative electrode volume resistivity ($\Omega \cdot cm$) | Positive electrode volume resistivity ($\Omega \cdot cm$) | Collector volume resistivity ($\Omega \cdot cm$) | Voltage after storage test |
|---|---|---|---|---|---|---|
|  | Carbon | PVdF |  |  |  |  |
| Comparative Example 2 | 94 | 6 | 0.30 | 3.5 | 3.2 | 12.40 V |
| Example 4 | 91.18 | 6 | 0.65 | 3.5 | 3.2 | 12.45 V |

As is seen from TABLE 8, the bipolar battery of Example 4 showed a small voltage drop after the storage test and was protected from an internal short circuit between the electrode active material layers. On the other hand, the bipolar battery of Comparative Example 2 showed a large voltage drop after the storage test and was not sufficiently protected from an internal short circuit. It is assumed from these results that, in Example 4, the application of the alumina plating (coating) made it possible to prevent developing conductivity by a percolation path throughout the negative electrode active material layer so that a short-circuit current did not flow continuously even in the occurrence of an internal short circuit. This assumption is also verified by the test result that the volume resistivity of the negative electrode of Example 4 was 2 times or higher than that of Comparative Example 2.

Comparative Example 5-A

A coin battery was produced in the same manner as in Comparative Example 1, except that the negative electrode active material layer was subjected to pressing by a roll press machine such that the electrode density of the negative electrode was set to 1.35 g/cm$^3$.

Comparative Example 5-B

A coin battery was produced in the same manner as in Comparative Example 1, except that the negative electrode active material layer was subjected to press treatment by a roll press machine such that the electrode density of the negative electrode active material layer was set to 1.65 g/cm$^3$.

Example 5-1

A polymer preparation solution was prepared by uniformly mixing 100 parts by mass of polyethylene oxide acrylate available under the trade name of Elexcel TA-140 (from Dai-ichi Kogyo Seiyaku Co., Ltd.) as a polymer component, 40 parts by mass of LiTFSI as a lithium salt and 300 mass ppm of organic peroxide (available under the trade name of Perkadox 16 from Kayaku Akzo Corporation) as a polymerization initiator with an appropriate amount of dimethyl carbonate (DMC) as a solvent.

Figure 8:
FIG. 8 is a scanning electron microscope (SEM) image of a negative electrode active material of Example 5-1.

A negative electrode active material was obtained by mixing the same particulate graphite as that of Comparative Example 1 with the above-prepared polymer preparation solution, desolvating and dispersing the polymer preparation solution at 50° C. under reduced pressure, and then, subjecting the polymer preparation solution to thermal polymerization at 80° C. for 2 hours such that a polymer coating was applied to the particulate graphite. The application amount of the polymer coating relative to 100 mass % of the particulate graphite is indicated in TABLE 9. Further, a scanning electron microscope (SEM) image of the negative electrode active material is shown in FIG. 8.

A coin battery was produced in the same manner as in Comparative Example 1, except that the electrode density of the negative electrode active material layer was set to 1.35 g/cm³ by press treatment.

Comparative Example 5-1

A coin battery was produced in the same manner as in Example 5-1, except that the electrode density of the negative electrode active material layer was set to 1.65 g/cm³ by press treatment.

Example 5-2

A coin battery was produced in the same manner as in Example 5-1, except for using polyethylene oxide acrylate available under the trade name of Elexcel PE-300 (from Dai-ichi Kogyo Seiyaku Co., Ltd.) as the polymer component.

Comparative Example 5-2

A coin battery was produced in the same manner as in Example 5-2, except that the electrode density of the negative electrode active material layer was set to 1.65 g/cm³ by press treatment.

Example 5-3

A coin battery was produced in the same manner as in Example 5-1, except for using polyethylene oxide acrylate available under the trade name of Elexcel PE-600 (from Dai-ichi Kogyo Seiyaku Co., Ltd.) as the polymer component.

Comparative Example 5-3

A coin battery was produced in the same manner as in Example 5-3, except that the electrode density of the negative electrode active material layer was set to 1.65 g/cm³ by press treatment.

Example 5-4

A coin battery was produced in the same manner as in Example 5-1, except for using polyethylene oxide acrylate available under the trade name of Elexcel BPE-4 (from Dai-ichi Kogyo Seiyaku Co., Ltd.) as the polymer component.

Comparative Example 5-4

A coin battery was produced in the same manner as in Example 5-4, except that the electrode density of the negative electrode active material layer was set to 1.65 g/cm³ by press treatment.

Example 5-5

A coin battery was produced in the same manner as in Example 5-4, except for changing the amount of coverage of the particulate graphite by the polymer component.

Comparative Example 5-5

A coin battery was produced in the same manner as in Example 5-5, except that the electrode density of the negative electrode active material layer was set to 1.65 g/cm³ by press treatment.

Example 5-6

A coin battery was produced in the same manner as in Example 5-1, except for using polyethylene oxide acrylate available under the trade name of Elexcel BPE-1 (from Dai-ichi Kogyo Seiyaku Co., Ltd.) as the polymer component.

Comparative Example 5-6

A coin battery was produced in the same manner as in Example 5-6, except that the electrode density of the negative electrode active material layer was set to 1.65 g/cm³ by press treatment.

[Battery Evaluation]

Each of the coin batteries of Comparative Examples 5-A, 5-B and 5-1 to 5-6 and Examples 5-1 to 5-6 was charged to 50 mV and measured for the discharge capacity at 0.1 C. Further, each of these coin batteries was measured for the capacity at 1.0 C and at 3.0 C and checked for the retention ratio of the capacity at 1.0 C and at 3.0 C relative to the capacity at 0.1 C.

The cell impedance of each coin battery was measured by electrochemical impedance spectroscopy under the conditions corresponding to 50% of the capacity at 0.1 C. The electrolytic solution resistance and reaction resistance of each cell were determined by frequency measurements in a range of 100 kHz to 0.1 mHz.

TABLE 9

|  | Coverage amount (wt %) | Electrode density (g/cm³) | 0.1 C discharge capacity (mAh/g) | 1.0 C/0.1 C capacity retention (%) |
|---|---|---|---|---|
| Example 5-1 | 2.3 | 1.35 | 330 | 97.2 |
| Example 5-2 | 2.4 | 1.35 | 345 | 98.2 |
| Example 5-3 | 1.7 | 1.35 | 333 | 99.1 |
| Example 5-4 | 1.9 | 1.35 | 337 | 99.1 |
| Example 5-5 | 4.5 | 1.35 | 335 | 97.3 |
| Example 5-6 | 1.8 | 1.35 | 343 | 97.7 |
| Comparative Example 5-A | — | 1.35 | 342 | 99.7 |
| Comparative Example 5-B | — | 1.65 | 340 | 99.4 |
| Comparative Example 5-1 | 2.3 | 1.65 | 330 | 93.9 |
| Comparative Example 5-2 | 2.4 | 1.65 | 344 | 98.2 |
| Comparative Example 5-3 | 1.7 | 1.65 | 330 | 100.0 |

TABLE 9-continued

| | | | | |
|---|---|---|---|---|
| Comparative Example 5-4 | 1.9 | 1.65 | 335 | 98.5 |
| Comparative Example 5-5 | 4.5 | 1.65 | 337 | 97.3 |
| Comparative Example 5-6 | 1.8 | 1.65 | 337 | 98.8 |

| | 3.0 C/0.1 C capacity retention (%) | Electrolytic solution resistance (Ω) | Reaction resistance (Ω) |
|---|---|---|---|
| Example 5-1 | 68.2 | 4.2 | 36.3 |
| Example 5-2 | 64.4 | 6.3 | 16.0 |
| Example 5-3 | 59.4 | 4.3 | 26.0 |
| Example 5-4 | 62.9 | 4.0 | 38.0 |
| Example 5-5 | 64.8 | 5.0 | 60.9 |
| Example 5-6 | 65.5 | 4.4 | 24.2 |
| Comparative Example 5-A | 78.8 | 4.0 | 11.2 |
| Comparative Example 5-B | 76.5 | 4.0 | 13.0 |
| Comparative Example 5-1 | 55.2 | 4.2 | 40.5 |
| Comparative Example 5-2 | 64.5 | 6.3 | 23.5 |
| Comparative Example 5-3 | 54.0 | 4.0 | 37.7 |
| Comparative Example 5-4 | 55.2 | 4.0 | 45.8 |
| Comparative Example 5-5 | 62.5 | 4.2 | 70.5 |
| Comparative Example 5-6 | 65.3 | 5.1 | 25.4 |

As is seen from TABLE 9, the insulating material was arranged on the surface of the negative electrode active material without causing a large increase in reaction resistance, which is one measure of lithium ion permeability, as the polymer coating was applied to the surface of the particulate graphite according to one embodiment of the present invention. It is assumed that this configuration made it possible to prevent developing conductivity by a percolation path throughout the negative electrode active material layer so that a short-circuit current did not flow continuously even in the occurrence of an internal short circuit. It is also seen from TABLE 9 that there was no large adverse influence on the battery characteristics such as discharge capacity and capacity retention in the configuration of Examples 5-1 to 5-6.

Examples 6-1 and 6-2

Spherical graphite (median size: 25 μm) as a negative electrode active material, sodium salt of carboxymethyl cellulose (CMC) as a water-soluble polymer and SBR (styrene-butadiene rubber) latex as a synthetic rubber adhesive were added into ion-exchanged water. At this time, the amount of ion-exchanged water was controlled such that the concentration of the CMC polymer was 2 mass %. The content ratio (mass ratio) of the respective component materials is indicated in TABLE 10. The resulting mixture was dissolved by stirring for 2 hours with the use of a three-one motor and left still for one day to drain air bubbles therefrom. A negative electrode active material slurry was obtained by controlling the total solid content of the mixture to nearly 50 mass % with the addition of ion-exchanged water. In each example, the negative electrode active material slurry was easily prepared in slurry form and had good performance such as in-plane coating variations of 1% or less after application.

TABLE 10

| | Content (wt %) | | | Slurrying | application variations |
|---|---|---|---|---|---|
| | Carbon | CMC | SBR | | |
| Example 6-1 | 94.5 | 0.5 | 5 | ○ | ○ |
| Example 6-2 | 93.5 | 1.5 | 5 | ○ | ○ |

Examples 6-3 to 6-6

Negative electrode active material slurries were prepared in the same manner as in Examples 6-1 and 6-2, except for controlling the content ratio of the respective component materials as indicated in TABLE 11.

Bipolar batteries were produced in the same manner as in Comparative Example 1, except for using the above-prepared negative electrode active material slurries for formation of the negative electrode active material layers, respectively.

[Battery Evaluation]

The coin batteries of Examples 6-3 to 6-6 were tested for the negative electrode volume resistivity, 0.2 C/0.5 C capacity retention and voltage drop amount during storage test in the same manner as above. Further, each of these coin batteries was subjected to 1 C cycle test in a thermostat of 35° C. and measured for the capacity retention after 100 cycles of 1 C cycle test. The test results of Examples 6-3 to 6-6 are indicated together with the test results of Comparative Example 1 in TABLE 11.

TABLE 11

| | Content (wt %) | | | Negative electrode volume resistivity (Ω · cm) | Coin battery | | |
|---|---|---|---|---|---|---|---|
| | | | | | 0.2 C/0.05 C capacity retention (%) | Storage test voltage drop amount (%) | Capacity after aging (%) |
| | Carbon | CMC | SBR | | | | |
| Comparative Example 1 | 94 | 6 (PVdF) | | 0.3 | 99 | 100 | 75 |
| Example 6-3 | 95 | 1 | 4 | 1.5 | 99 | 35 | 82 |
| Example 6-4 | 92 | 1 | 7 | 3.1 | 99 | 30 | 83 |
| Example 6-5 | 90 | 1 | 9 | 3.9 | 99 | 30 | 85 |
| Example 6-6 | 89 | 1 | 10 | 4.5 | 99 | 29 | 85 |

As is seen from TABLE 11, the coin batteries of Examples 6-3 to 6-6 showed a significantly small voltage drop after the storage test as compared to that of Comparative Example 1. Further, the volume resistivity of the negative electrode active material layers of Examples 6-3 to 6-6 was 5 to 15 times higher than that of Comparative Example 1. In these examples, the coating of the synthetic rubber adhesive (SBR) was applied to the surfaces of the negative electrode active material particles. It is assumed that this configuration made it possible to prevent developing conductivity by a percolation path throughout the negative electrode active material layer so that a short-circuit current did not flow continuously even in the occurrence of an internal short circuit.

Examples 6-7 to 6-10

Coin batteries were produced in the same manner as in Examples 6-3 to 6-5, except for changing the content ratio of the respective component materials in the negative electrode active material slurry as indicated in TABLE 12. In Example 6-7, the content of the CMC polymer was set to 1.5 mass % in view of the difficulty in applying the negative electrode active material slurry due to too low electrode viscosity. In Example 6-10, the electrode was formed using the 1% CMC solution as it was impossible to prepare the 2% CMC solution due to too high viscosity of the CMC polymer.

[Battery Evaluation]

The coin batteries of Examples 6-7 to 6-10 were tested for the negative electrode volume resistivity, 0.2 C/0.5 C capacity retention, voltage drop amount during storage test and cycle retention in the same manner as above. The test results of Examples 6-7 to 6-10 are indicated together with the test results of Comparative Example 1 in TABLE 12.

TABLE 12

| | Materials | | | | Negative electrode volume resistivity ($\Omega \cdot cm$) |
|---|---|---|---|---|---|
| | Carbon content | CMC 1% viscosity | CMC content | SBR content | |
| Comparative Example 1 | 94 | — | 6 (PVdF) | | 0.3 |
| Example 6-7 | 91.5 | 300 | 1.5 | 7 | 3.6 |
| Example 6-8 | 92 | 500 | 1 | 7 | 3.0 |
| Example 6-9 | 92 | 6000 | 1 | 7 | 3.1 |
| Example 6-10 | 92.5 | 10000 | 1 | 7 | 3.1 |

| | Coin battery | | |
|---|---|---|---|
| | 0.2 C/0.05 C capacity retention (%) | Storage test volume drop amount (%) | Cycle retention (%) |
| Comparative Example 1 | 99 | 100 | 75 |
| Example 6-7 | 96 | 30 | 77 |
| Example 6-8 | 99 | 30 | 85 |
| Example 6-9 | 99 | 30 | 85 |
| Example 6-10 | 99 | 35 | 85 |

As is seen from TABLE 12, the coin batteries of Examples 6-7 to 6-10 showed a significantly small voltage drop after the storage test as compared to that of Comparative Example 1. Further, the volume resistivity of the negative electrode active material layers of Examples 6-3 to 6-6 was 10 times or higher than that of Comparative Example 1. In these examples, the coating of the synthetic rubber adhesive (SBR) was applied to the surfaces of the negative electrode active material particles. It is assumed that this configuration made it possible to prevent developing conductivity by a percolation path throughout the negative electrode active material layer so that a short-circuit current did not flow continuously even in the occurrence of an internal short circuit.

In Example 6-7 in which the content of the CMC polymer was relatively high, the capacity retention of the battery was lowered with relative decrease in the content of the negative electrode active material. In Example 6-10 in which the viscosity of the CMC polymer was high, the electrode was formed using the 1% CMC solution as mentioned above. This made it necessary to add a large amount of the CMC solution so that the solid content of the negative electrode active material slurry was decreased. As a result, the coating had in-plane variations (±3% or more) in density after drying.

Example 6-11

A coin battery was produced in the same manner as in Example 6-4, except for using platy graphite in place of the particulate graphite. As a result, the volume resistivity of the negative electrode was slightly lowered from 3.1Ω to 2.2Ω; and the voltage drop of the battery after the storage test was slightly increased from 30% to 32%. It is suggested from this data that the particulate graphite is more preferred than the platy graphite.

Example 7

A bipolar battery was produced in the same manner as in Comparative Example 2, except for using the negative electrode active material slurry prepared in Example 6-4 for formation of the negative electrode active material layer.

[Battery Evaluation]

The bipolar battery of Example 7 was charged to 12.5 V at a constant current (CC) of 0.5 mA and then at a constant voltage (CV) (total 10 hours), left in left still in a thermostat of 35° C. for one month and measured for the amount of drop in battery voltage. The test results of Example 7 are indicated together with the test results of Comparative Example 2 in TABLE 13. Further, the volume resistivity of the electrode was measured as follows. The electrode layer was applied on a PET sheet. The resulting laminate was cut into a sheet of 80 mm×50 mm size. The electrical resistance of the cut laminate sheet was measured with the use of Loresta EP MCP-T-360 (manufactured by Mitsubishi Chemical Analytech Co., Ltd.) upon contact of a probe-type ASP terminal with an intersection of diagonal lines of the laminate sheet. The volume resistivity ($\Omega \cdot cm$) was determined by converting the measurement resistance value to a surface resistivity ($\Omega/sq$) by multiplication by a correction coefficient of RCF=4.2353 and multiplying the surface resistivity by the thickness t (cm) of the electrode layer of the laminated sheet. The volume resistivity of the collector was measured in the same manner as above.

TABLE 13

| | Content (wt %) | | Negative electrode volume resistivity ($\Omega \cdot cm$) | Positive electrode volume resistivity ($\Omega \cdot cm$) | Collector volume resistivity ($\Omega \cdot cm$) | Voltage after storage test |
|---|---|---|---|---|---|---|
| | Carbon | PVdF | | | | |
| Comparative Example 2 | 94 | 6 | 0.30 | 3.5 | 3.2 | 12.40 V |
| Example 7 | 92 | 6 | 0.65 | 3.5 | 3.2 | 12.45 V |

As is seen from TABLE 13, the bipolar battery of Example 7 showed a small voltage drop after the storage test and was protected from an internal short circuit between the electrode active material layers. On the other hand, the bipolar battery of Comparative Example 2 showed a large voltage drop after the storage test and was not sufficiently protected from an internal short circuit. It is assumed from these results that, in Example 7, the addition of the styrene-butadiene rubber as the synthetic rubber adhesive made it possible to prevent developing conductivity by a percolation path throughout the negative electrode active material layer so that a short-circuit current did not flow continuously even in the occurrence of an internal short circuit. This assumption is also verified by the test result that the volume resistivity of the negative electrode of Example 7 was 2 times or higher than that of Comparative Example 2.

The invention claimed is:

1. A negative electrode for a secondary battery, comprising:
   a collector; and
   a negative electrode active material layer formed on a surface of the collector and containing a binder and negative electrode active material particles,
   wherein the negative electrode active material layer further contains an insulating material in an amount of weight fraction exceeding a percolation threshold such that the negative electrode active material particles are dispersed in the binder with a coating of the insulating material being applied to at least a part of a surface of each of the negative electrode active material particles so as to prevent developing conductivity by a percolation path throughout the negative electrode active material layer;
   wherein the insulating material is an ion-permeable resin;
   wherein the coating has a thickness of 0.1 to 5 μm; and
   wherein the negative electrode active material layer has a density of 0.9 to 1.6 g/cm$^3$.

2. The negative electrode for the secondary battery according to claim 1, wherein the ion-permeable resin is polyethylene oxide.

3. The negative electrode for the secondary battery according to claim 1, wherein the negative electrode active material particles are formed of a conductive material.

4. The negative electrode for the secondary battery according to claim 3, wherein the material of the negative electrode active material particles is a carbon material.

5. A secondary battery, comprising a power generating element with an electric cell unit, the electric cell unit comprising:
   a positive electrode having a collector and a positive electrode active material layer formed on a surface of the collector; and
   a negative electrode having a collector and a negative electrode active material layer formed on a surface of the collector;
   an electrolyte layer laminated between the positive electrode and the negative electrode in such a manner that the active material layer of the positive electrode and the active material layer of the negative electrode face each other via the electrolyte layer,
   wherein the negative electrode is the negative electrode for the secondary battery according to claim 1.

6. The secondary battery according to claim 5, wherein the secondary battery is a bipolar battery having a bipolar electrode in which the positive and negative electrode active material layers are formed on respective sides of the collector; and wherein the collector is a resin conductor formed with a conductive resin layer.

7. The secondary battery according to claim 5, wherein a volume resistivity of the negative electrode active material layer is 0.1 to 1 time a volume resistivity of the positive electrode active material layer.

8. A process of producing a negative electrode for a secondary battery, comprising:
   a first step of obtaining complexes of negative electrode active material particles and an insulating material by applying a coating of the insulating material to at least a part of a surface of each of the negative electrode active material particles;
   a second step of preparing a negative electrode active material slurry by mixing the complexes of the negative electrode active material particles and the insulating material obtained in the first step with a binder and a solvent; and
   a third step of applying and drying the negative electrode active material slurry to a surface of a collector to form a negative electrode active material layer on the surface of the collector,
   wherein the insulating material is an ion-permeable resin and is contained in an amount of weight fraction exceeding a percolation threshold such that the negative electrode active material particles are dispersed in the binder with the coating of the insulating material being applied to the negative electrode active material particles so as to prevent developing conductivity by a percolation path throughout the negative electrode active material layer;
   wherein the coating has a thickness of 0.1 to 5 μm; and
   wherein the negative electrode active material layer has a density of 0.9 to 1.6 g/cm$^3$, to produce the negative electrode of claim 1.

9. The process of producing the negative electrode for the secondary battery according to claim 8, wherein the insulating material is contained in an amount of 0.5 to 30 mass % relative to 100 mass % of the negative electrode active material layer formed in the third step.

10. A negative electrode for a secondary battery, comprising:
   a resin collector formed with a conductive resin layer; and
   a negative electrode active material layer formed on a surface of the resin collector and containing a binder and negative electrode active material particles,
   wherein the negative electrode active material layer further contains an insulating material such that the negative electrode active material particles are dispersed in the binder with a coating of the insulating material being applied to at least a part of a surface of each of the negative electrode active material particles so as to prevent developing conductivity by a percolation path throughout the negative electrode active material layer;
   wherein the insulating material is an ion-permeable resin;
   wherein the coating has a thickness of 0.1 to 5 μm; and
   wherein the negative electrode active material layer has a density of 0.9 to 1.6 g/cm$^3$.

11. A negative electrode for a secondary battery, comprising:
   a collector;
   a negative electrode active material layer formed on a surface of the collector and containing a binder and negative electrode active material particles,
   wherein the negative electrode active material layer further contains an insulating material such that the negative electrode active material particles are dispersed in the binder with a coating of the insulating material being applied to at least a part of a surface of each of the negative electrode active material particles so as to prevent developing conductivity by a percolation path throughout the negative electrode active material layer;
   wherein the insulating material is an ion-permeable resin;
   wherein the coating has a thickness of 0.1 to 5 μm;
   wherein the negative electrode active material has a volume resistivity of 0.32 to 122 Ωcm; and
   wherein the negative electrode active material layer has a density of 0.9 to 1.6 g/cm$^3$.

12. The negative electrode for the secondary battery according to claim 1, wherein at least two of the negative electrode active material particles, each of which has the coating of the insulating material applied to at least a part of a surface thereof, are arranged such that a first of the negative electrode active material particles is lower than a second of the negative electrode active material particles.

13. The negative electrode for the secondary battery according to claim 10, wherein a first of the negative electrode active material particles having the coating applied to at least a part of a surface thereof is offset in a vertical direction from a second of the negative electrode active material particles having the coating applied to at least a part of a surface thereof.

14. The negative electrode for the secondary battery according to claim 11, wherein respective particles of a plurality of the negative electrode active material particles are at different heights.

15. The process of producing the negative electrode for the secondary battery according to claim 8, wherein at least two of the negative electrode active material particles, each of which has the coating of the insulating material applied to at least a part of a surface thereof, are arranged such that a first of the negative electrode active material particles is lower than a second of the negative electrode active material particles.

* * * * *